(12) United States Patent
Yada et al.

(10) Patent No.: US 10,678,571 B2
(45) Date of Patent: Jun. 9, 2020

(54) IMAGE-BASED SKILL TRIGGERING

(71) Applicant: Microsoft Technology Licensing, LLC, Redmond, WA (US)

(72) Inventors: Ravi Theja Yada, Newcastle, WA (US); Surendra S. Ulabala, Bothell, WA (US); Wallace E. Greathouse, Kirkland, WA (US); Arun K. Sacheti, Sammamish, WA (US); Parthasarathy Govindarajen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 16/035,180

(22) Filed: Jul. 13, 2018

(65) Prior Publication Data

US 2020/0019419 A1 Jan. 16, 2020

(51) Int. Cl.
*G06F 3/0484* (2013.01)
*G06F 9/451* (2018.01)
*G06K 9/00* (2006.01)
*G06N 20/00* (2019.01)
*G06F 16/532* (2019.01)
*G06F 16/9535* (2019.01)

(52) U.S. Cl.
CPC .......... *G06F 9/453* (2018.02); *G06F 3/04842* (2013.01); *G06F 3/04847* (2013.01); *G06F 16/532* (2019.01); *G06F 16/9535* (2019.01); *G06K 9/00664* (2013.01); *G06N 20/00* (2019.01)

(58) Field of Classification Search
CPC ...................................................... G06F 17/00
See application file for complete search history.

(56) References Cited

U.S. PATENT DOCUMENTS

| 8,473,525 | B2 * | 6/2013 | McIntyre et al. ....... G06F 17/30 |
| 2003/0161499 | A1 * | 8/2003 | Svendsen et al. ....... G06K 9/00 |
| 2017/0083511 | A1 * | 3/2017 | Hartrell et al. ......... G06F 17/28 |
| 2017/0098159 | A1 * | 4/2017 | Sharifi et al. ......... G06F 3/0484 |
| 2017/0139879 | A1 * | 5/2017 | Sharifi et al. ....... G06F 17/2235 |
| 2018/0367484 | A1 * | 12/2018 | Rodriguez et al. ... H04L 51/063 |
| 2019/0212749 | A1 * | 7/2019 | Chen et al. .......... G05D 1/0221 |

OTHER PUBLICATIONS

"Bing Visual Search", Retrieved from: https://www.youtube.com/watch?v=TjcPp5te3X4, May 9, 2018, 1 Page.
"Bing Visual Search Developer Platform", Retrieved from: https://www.bingvisualsearch.com/skills/share?sharecode=3RWWSK, Retrieved on: Sep. 19, 2018, 2 Pages.

(Continued)

*Primary Examiner* — James J Debrow
(74) *Attorney, Agent, or Firm* — Rainier Patents, P.S.

(57) ABSTRACT

This document relates to using input images to selectively trigger skills. For example, the input images can be analyzed using a machine learning model, which can output image metadata characterizing content of the input images. Different skills can be selectively triggered based on the image metadata. For example, a given skill can register to be triggered when the image metadata matches one or more triggering conditions specified by that skill.

20 Claims, 16 Drawing Sheets

(56) References Cited

OTHER PUBLICATIONS

"Capture more users with Bing Visual Search", Retrieved from: https://www.youtube.com/watch?v=fj1BX2INbZE, May 4, 2018, 1 Page.
"Capture new audiences with Bing visual intelligence", Retrieved from: https://www.bingvisualsearch.com/, Aug. 22, 2018, 3 Pages.
"Cognitive Services—Discover Bing Visual Search & Developer Platform : Build 2018", Retrieved from https://www.youtube.com/watch?v=VI3GUfrxJk8, May 9, 2018, 1 Page.
ANMOL, "Microsoft now lets developers build Skills for Bing Visual Search", Retrieved from https://mspoweruser.com/microsoft-now-lets-developers-build-skills-for-bing-visual-search/, May 7, 2018, 15 Pages.

* cited by examiner

IMAGE-BASED SKILL TRIGGERING

BACKGROUND

Computer users have various mechanisms for identifying and interacting with useful software. For example, a user might know of a specific program and choose to download that program on a personal computer, or might choose to download a specific app on a mobile device. As another example, a user might access a particular web server via a web link to interact with a server-side software program. Generally, however, these approaches require the user to have advance knowledge of specific software solutions they want to use, or to spend time searching for software that is appropriate for the problem they are trying to solve.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for image-based skill triggering. One example includes a method or technique that can be performed on a computing device. The method or technique can include registering a plurality of skills with associated triggering conditions. The method or technique can also include receiving an input image and obtaining image metadata for the image. The image metadata can include image metadata values determined by a machine learning model based at least on an analysis of the input image. The method or technique can also include determining whether the image metadata values determined by the machine learning model match an individual triggering condition for an individual skill. The method or technique can also include triggering the individual skill responsive to determining that the image metadata values determined by the machine learning model match the individual triggering condition for the individual skill.

Another example includes a skill triggering system that includes a hardware processing unit and a storage resource. The storage resource can store computer-readable instructions which, when executed by the hardware processing unit, cause the hardware processing unit to obtain input images identified by a plurality of client devices. The computer-readable instructions can also cause the hardware processing unit to obtain image metadata describing content of the images. The image metadata can be provided by a machine learning model. The computer-readable instructions can also cause the hardware processing unit to selectively trigger different skills for different client devices based at least on the image metadata.

Another example includes a method or technique that can be performed on a computing device. The method or technique can include providing registration data for a particular skill to a skill triggering service. The registration data can include a triggering condition specifying when the particular skill should be triggered and a resource locator of the particular skill. The method or technique can also include receiving, at the resource locator, image metadata for an image from the skill triggering service. The image metadata can include image metadata values determined by a machine learning model. The method or technique can also include processing the image metadata using the particular skill.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
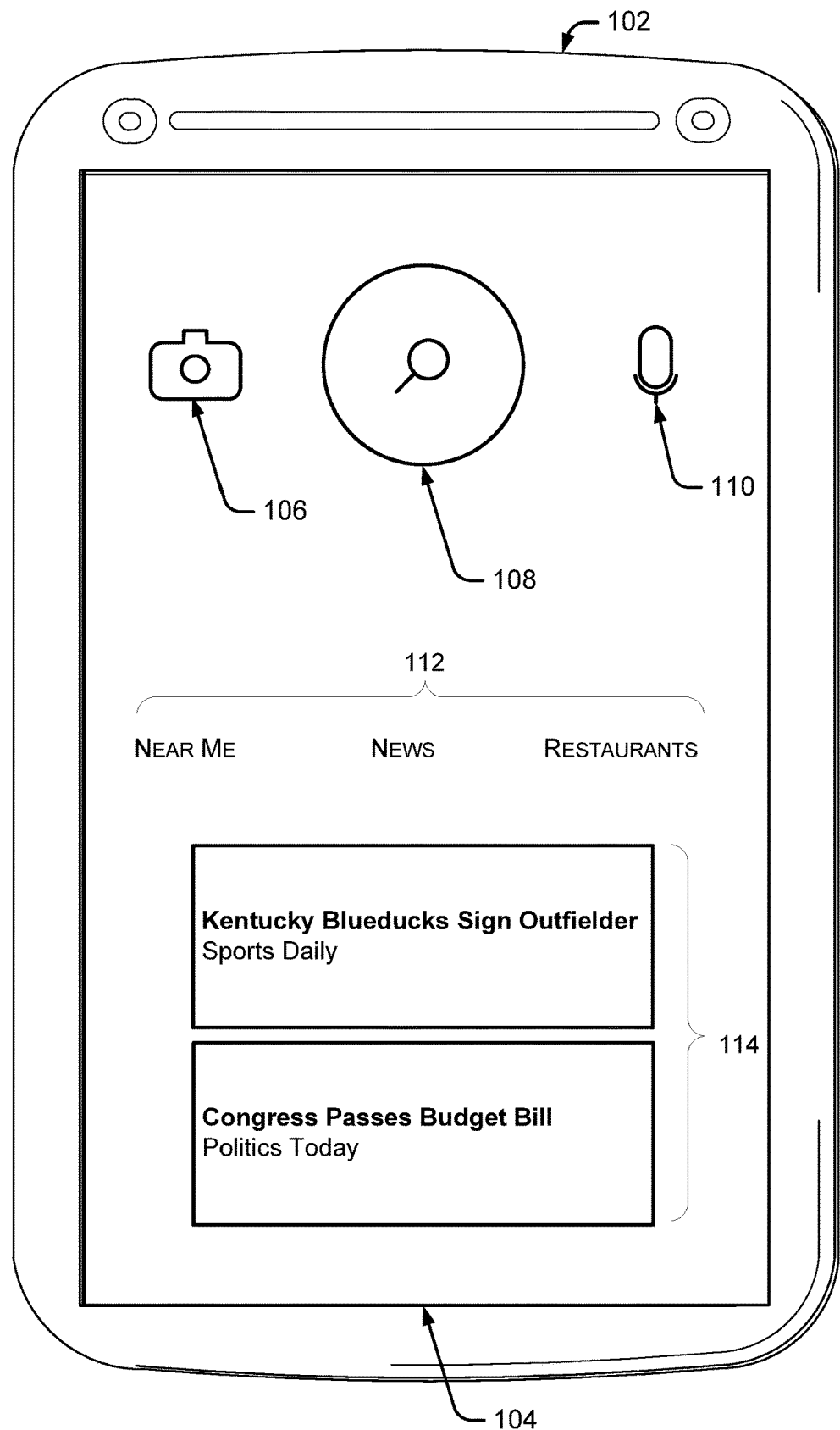
FIGS. 1-6 and 8-13 illustrate exemplary graphical user interfaces that are consistent with some implementations of the present concepts.

As noted above, one way for a user to interact with software, such as a locally-executed application or a remote web service, is to have prior knowledge of where to obtain the software. Other approaches can involve automatically directing the user to software based on user input indicating an express interest in performing some task. For example, a user can use a search engine to find an online web calculator or to download a calculator for execution locally on their computer. Alternatively, the user can use an app store to find a calculator app for their mobile device. In these examples, the user typically provides some specific indication of their intent, e.g., by typing a query such as "calculator" into a search engine or app store. In either case, the software is often a dedicated application that performs specific functionality requested by the user.

An alternative approach to using a dedicated application is to extend the functionality of some other application. For example, consider the problem of safely accessing websites. One approach is to download a dedicated security program that runs as a separate executable to prevent the user's browser from accessing unsafe websites. Alternatively, the user could download an add-on, such as a browser plug-in or extension that performs similar functionality by integrating with the browser. Thus, in this case, the functionality of the browser is extended by the add-on rather than using a separate program to provide security. Again, the user will typically provide some specific indication of an intent to obtain security software, e.g., by querying a search engine or add-on repository with keywords such "antivirus program," "malware blocker," etc.

Another way to extend the functionality of an application is to use an add-on such as a "skill." Generally, a skill can be a software code module that provides a particular ability to an application, e.g., by providing a customized user experience. For example, one entity can provide a digital assistant application that performs a broad range of native functions for the user, such as web searches, weather queries, etc. Another entity can extend the digital assistant by providing a skill that integrates with the digital assistant. For example, the third party can provide a game function that is invoked by the digital assistant when requested by the user, e.g., "Assistant, let's play Name That Tune." In this case, the user explicitly indicates their intent by speaking the name of the game that they would like to play.

Extending an application with an add-on such as a skill can have various benefits relative to using a stand-alone application. One such benefit relates to code reuse. For example, different skill developers can integrate their skills with the same application and rely on existing capabilities provided by that application, rather than developing entirely new custom applications. Consider a skill that plays "Name That Tune" and another skill that allows users to shop for movie tickets by voice. While these skills have very different purposes and functionality, both of these skills can integrate with a digital assistant to obtain voice recognition and natural language understanding functionality, rather than having to incorporate all of these features into a separate application.

In addition, skill developers may have subject matter expertise on a particular topic, and this may be reflected in the skill code that they develop. As another example, consider a skill that deals specifically with food items and that integrates with a search engine application. The skill might have an extensive data catalog of recipes, grocery store inventories, restaurant reviews, etc., that are not necessarily available to the search engine. On the other hand, the search engine might provide functionality such as location services that identify nearby grocery stores and restaurants, and the skill developer can rely on these location services rather than writing duplicative code to perform these functions.

In addition to code reuse benefits, there can be security benefits to extending an application with an add-on rather than writing a new, separate application. When a self-contained application is written, the application might perform low-level operations such as memory management that can create security vulnerabilities, or access certain data that users would prefer to remain private. By using application add-ons such as skills, these security and privacy concerns can be mitigated. For example, a skill or other type of add-on may use a predetermined, carefully curated set of application programming interfaces (API's) to interface with another application. However, despite these benefits, techniques for extending applications via add-ons still generally require the user to affirmatively and/or explicitly state what the user wants to do.

The disclosed implementations set forth herein can direct the user to useful skills by inferring the intent of the user from images. For example, the user can designate a particular image via user input, and the disclosed implementations can obtain image metadata that describes characteristics of the image. The disclosed implementations can then automatically identify certain relevant skills to provide to a user based on the values in the image metadata. Using these techniques, the disclosed implementations can infer the user's potential interest in specific skills from the image and trigger those skills, without necessarily requiring the user to specifically state their intent. By doing so, the disclosed implementations can help users to discover and utilize functionality that they might find useful, while also providing the security and privacy benefits of application extensions discussed above. In addition, the disclosed implementations can allow skill developers to reach a wide audience of potential users that may not know about the existence of a given skill.

Example User Experience

FIG. 1 illustrates an example client device 102 displaying a search interface 104. In this example, the search interface can be an interface for a local search application that allows users to query a remote search engine, as discussed more below. The search interface can have a camera icon 106, a text search icon 108, a microphone icon 110, a search type section 112, and a news feed section 114. Camera icon 106 can allow a user to select a photo to submit to the search engine. Text search icon 108 can allow a user to enter a text query for submission to the search engine. Microphone icon 110 can allow the user to enter a voice message to submit to the search engine. Search type section 112 includes various additional icons that can allow users to search for specific types of information instead of more general search queries. News feed section 114 provides instant access to breaking news stories.

By selecting camera icon 106, the user can identify an image to upload to the search engine as a query. For example, the user may be taken to a camera application to take a picture with a camera of the client device, and the image can be uploaded to the search engine. In other implementations, the user can select an image from a personal camera roll stored on the client device, or accessed the image remotely via a webpage, the search engine, etc.

Figure 2:
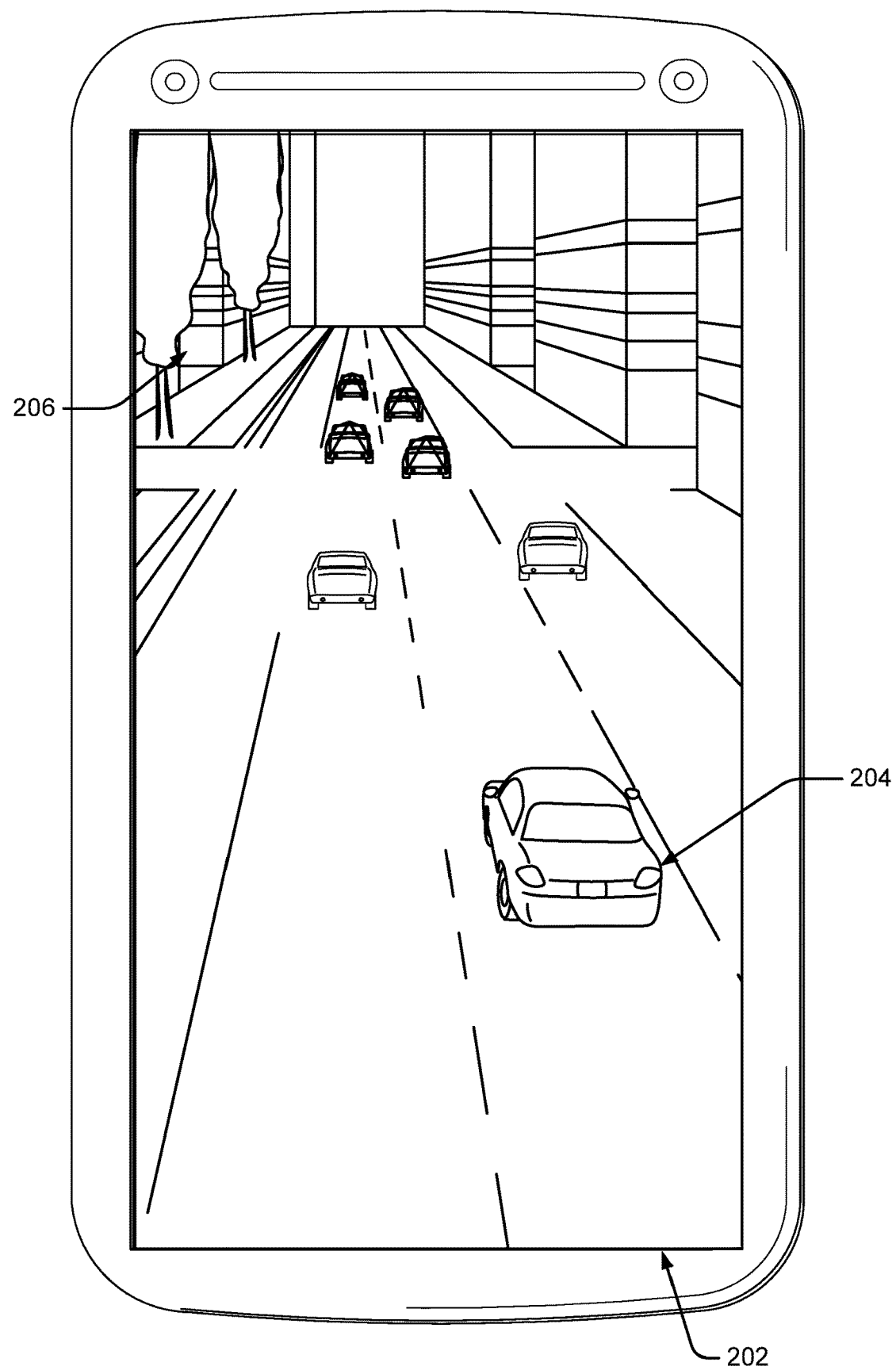
Figure 3:
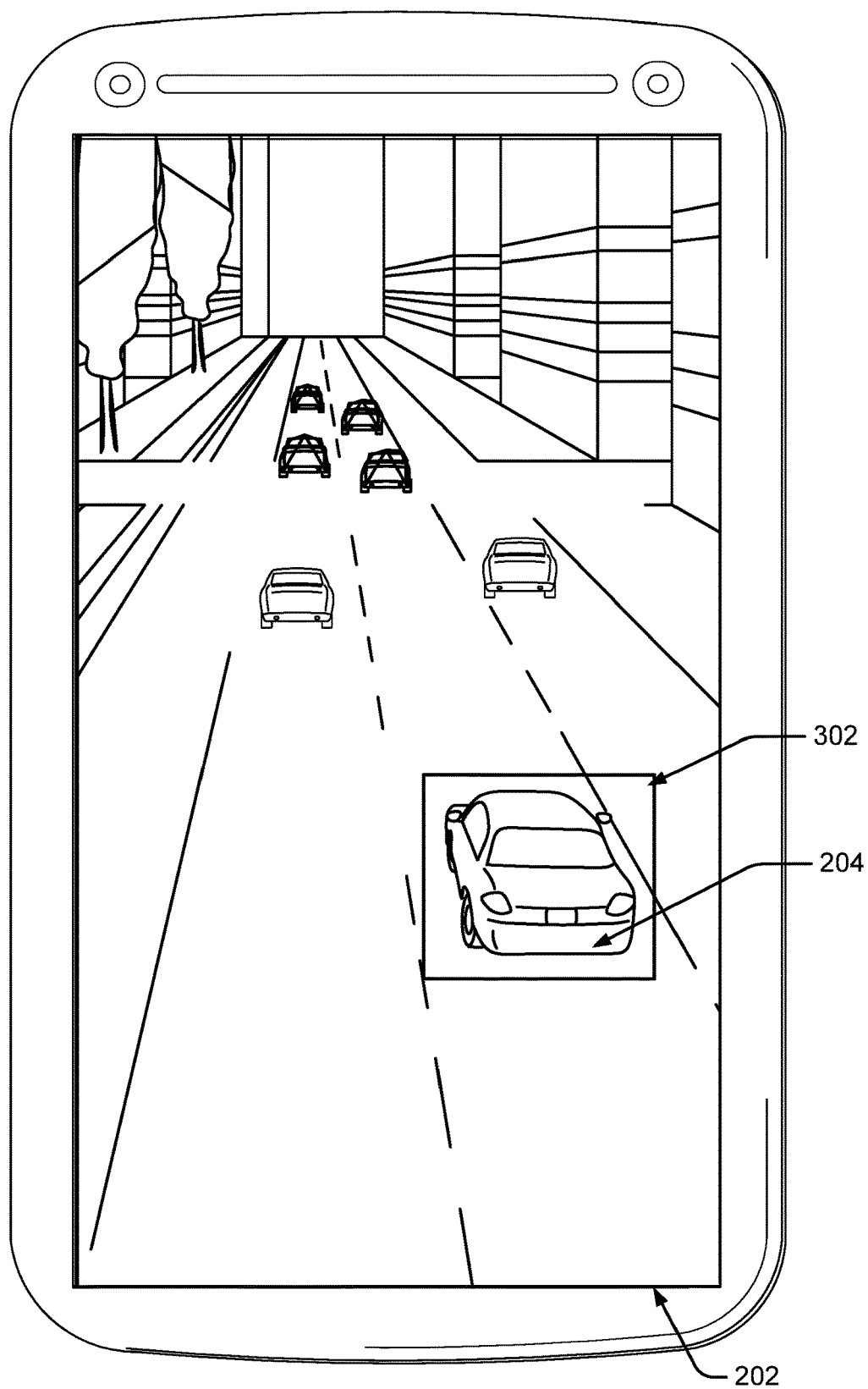

Assume the user selects an image 202, as shown in FIG. 2. Image 202 shows a traffic scenario where a number of different vehicles are visible from behind, including a car 204. Image 202 also includes a building 206. Now, assume the user would like to learn more information about a particular car shown in the image. As shown in FIG. 3, the user may perform a cropping function to create a bounding box 302 around car 204 to indicate to the search application that the user is specifically interested in this particular portion of the image. Note that the user may not know much about the car, e.g., the user may not know the manufacturer or model of the car, as these details may not be readily apparent from the image. Thus, while the user may intend to learn something about this specific car, the user may not even be able to verbally identify the car.

Figure 4:
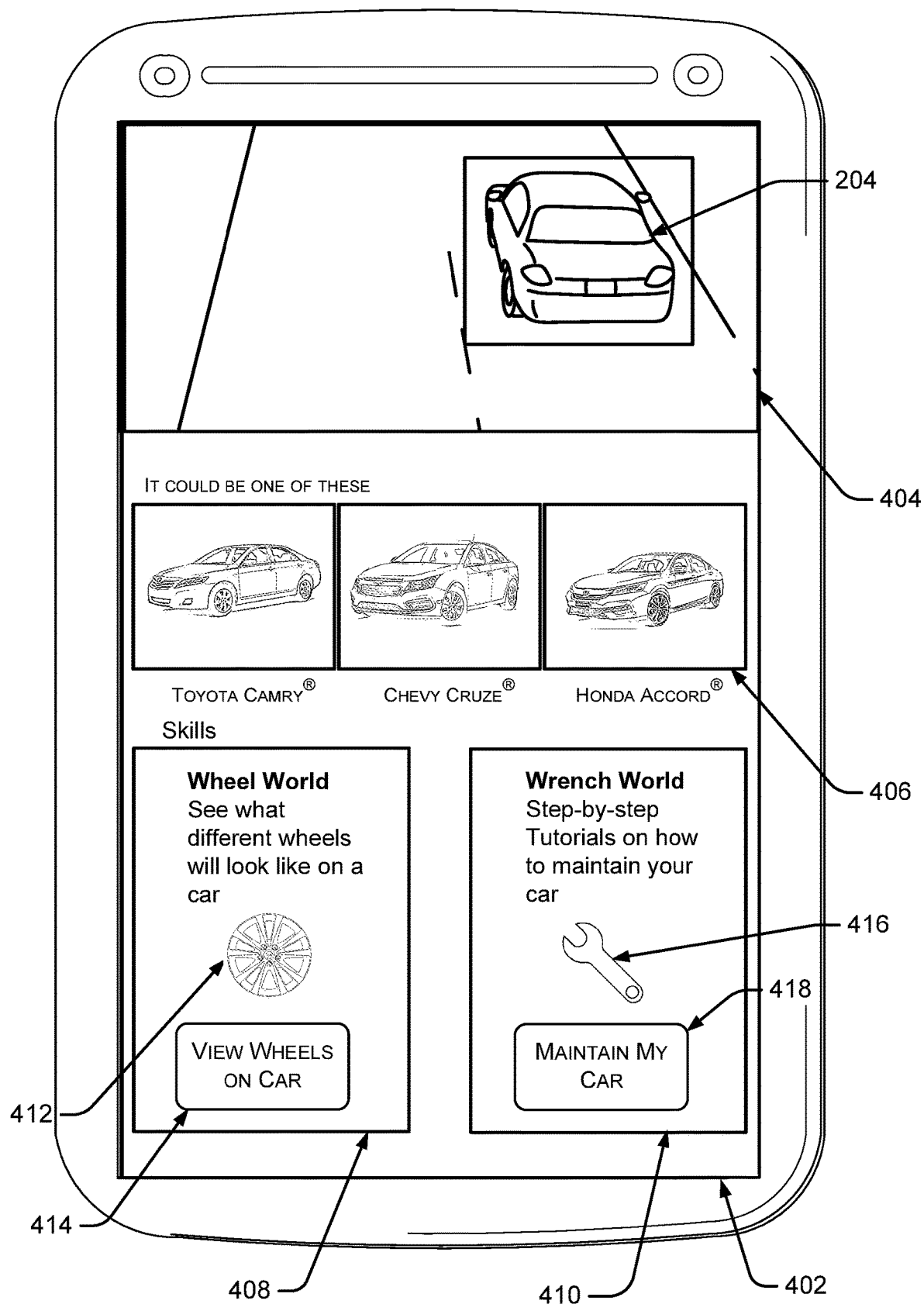

Next, the search engine may process the image and the local search application can show a search results interface 402, as shown in FIG. 4. The search results interface includes an image section 404 that includes a zoomed-in view of car 204, an image search results section 406 that includes various images identified by the search engine in response to the query, a Wheel World graphical element 408, and a Wrench World graphical element 410. The Wheel World graphical element relates to a Wheel World skill that has been triggered by the image 202, and the Wrench World graphical element relates to a Wrench World skill that has been triggered by the image. Note that the term "trigger" as used herein refers to acts relating to identifying a skill to present to a user so that the user may subsequently "launch" or "invoke" the skill.

Wheel World graphical element 408 can include a Wheel World icon 412 and a Wheel World launch element 414, and Wrench World graphical element 410 can include a Wrench World icon 416 and a Wrench World launch element 418. Note that Applicant does not have any relation to Toyota Motor Corp., Honda Motor Company, General Motors Company, any other business entities mentioned in this document. Real life automobile models are mentioned wherever possible solely to aid the reader in understanding the present concepts.

As discussed more below, the Wheel World skill and Wrench World skill may be skills triggered by a skill triggering service as potentially relevant to the search query submitted by the user. In particular, the skill triggering service may use a machine learning model to process the image submitted by the user and determine that the Wheel World and Wrench World skills should be triggered based on metadata output by the search engine.

Figure 5:
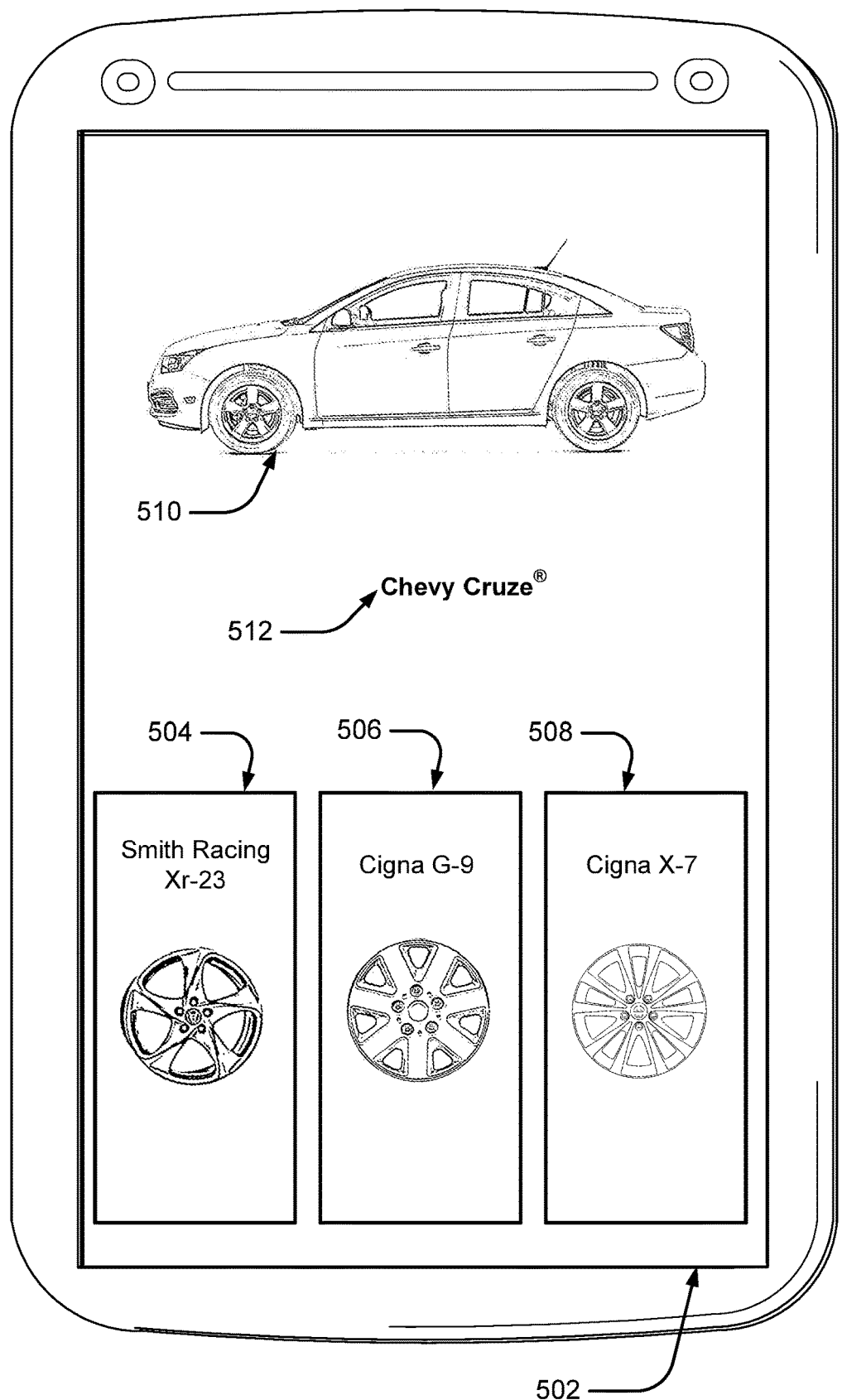

Now, assume the user would like to try out the Wheel World skill. The user can select Wheel World launch element 414, and this will cause the Wheel World skill to be performed. The Wheel World skill can present the user with a skill interface 502 as shown in FIG. 5. Skill interface 502 can include a first wheel option 504, a second wheel option 506, and a third wheel option 508. The skill interface can also include a car image 510 of a car that matches the particular model of car that is present in bounding box 302. The skill interface can also provide an identified car model 512 with the car image.

Figure 6:
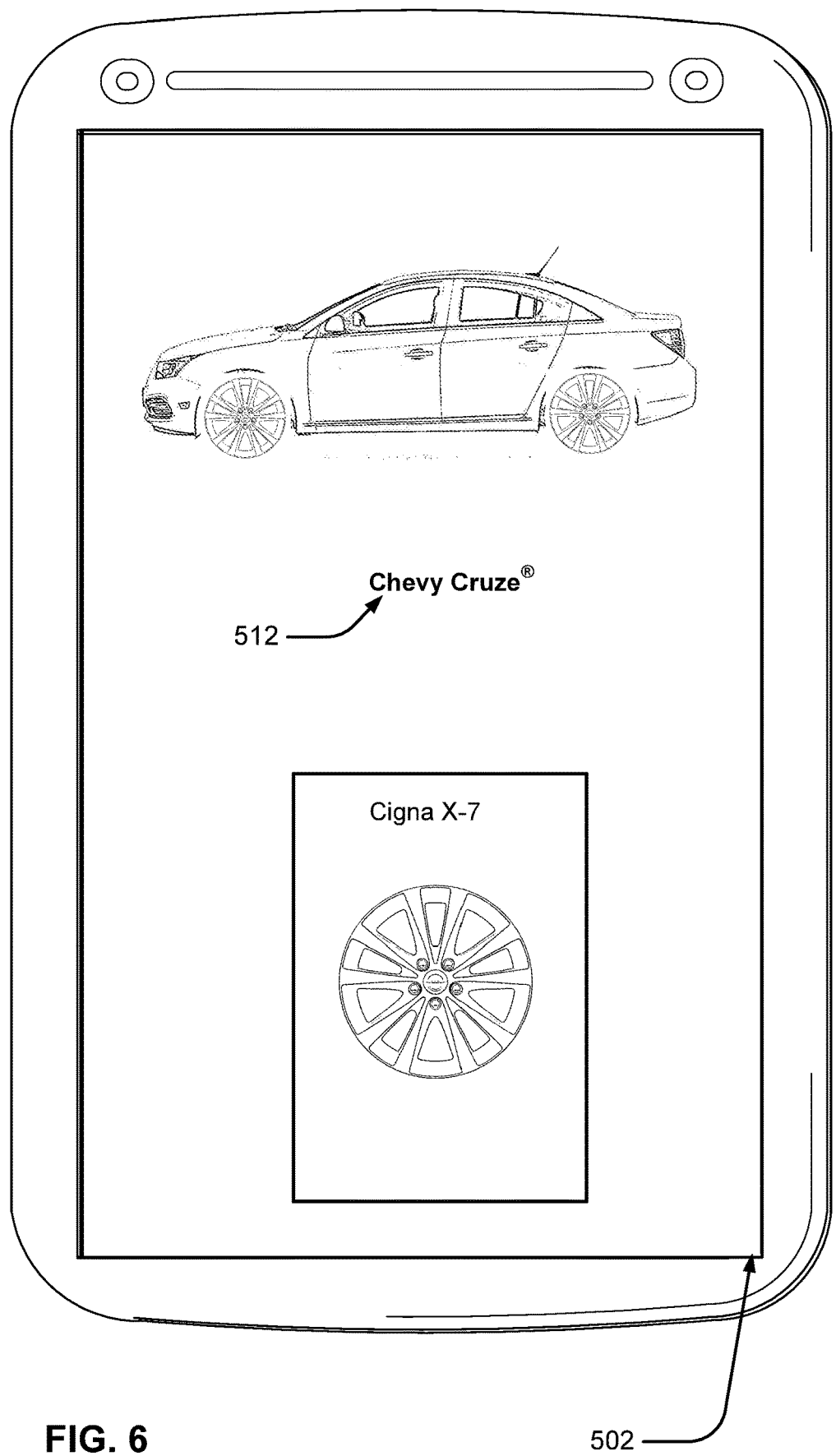

Now, assume the user would like to see the Cigna X-7 wheel on the Chevy Cruze®, so they select third wheel option 508. The Wheel World skill can update skill interface 502 as shown in FIG. 6, so that the user can see what the Cigna X-7 wheel will look like if installed on the car. Also, note that the Wheel World skill has determined that the car in question is a Chevy Cruze®. This may be the case where the Wheel World skill has its own image recognition capabilities that are specifically built to recognize vehicle models. In contrast, the machine learning model may have a more general-purpose image recognition model that may be less accurate for vehicle recognition purposes, but that provides a much broader range of image recognition capabilities. Thus, the image search results section 406 includes various car models identified by the machine learning model, whereas the Wheel World skill is able to specifically identify a single correct car model.

Note that the user experience above does not require the user to specifically state a particular intent. Indeed, the user may not have necessarily been able to identify the model of car 204 on their own, and the user may not have specifically had the intent to view wheels on the car in mind. Nevertheless, because the user indicated an interest in the image 202, the disclosed implementations were able to identify the model of car for the user and direct the user to a useful skill.

Example Processing Flow

Figure 7:
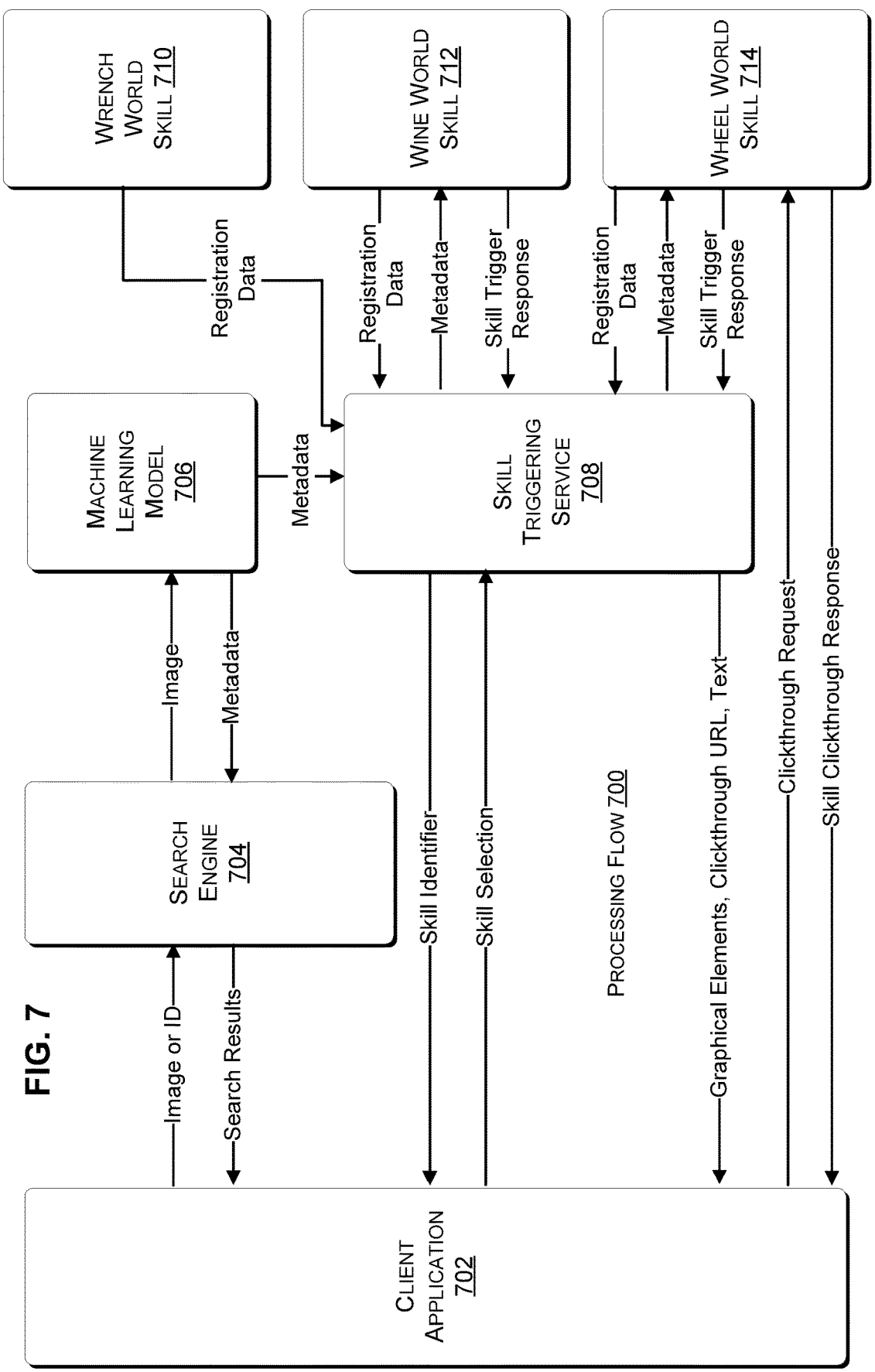
FIG. 7 illustrates an exemplary processing flow that is consistent with some implementations of the present concepts.
Figure 8:
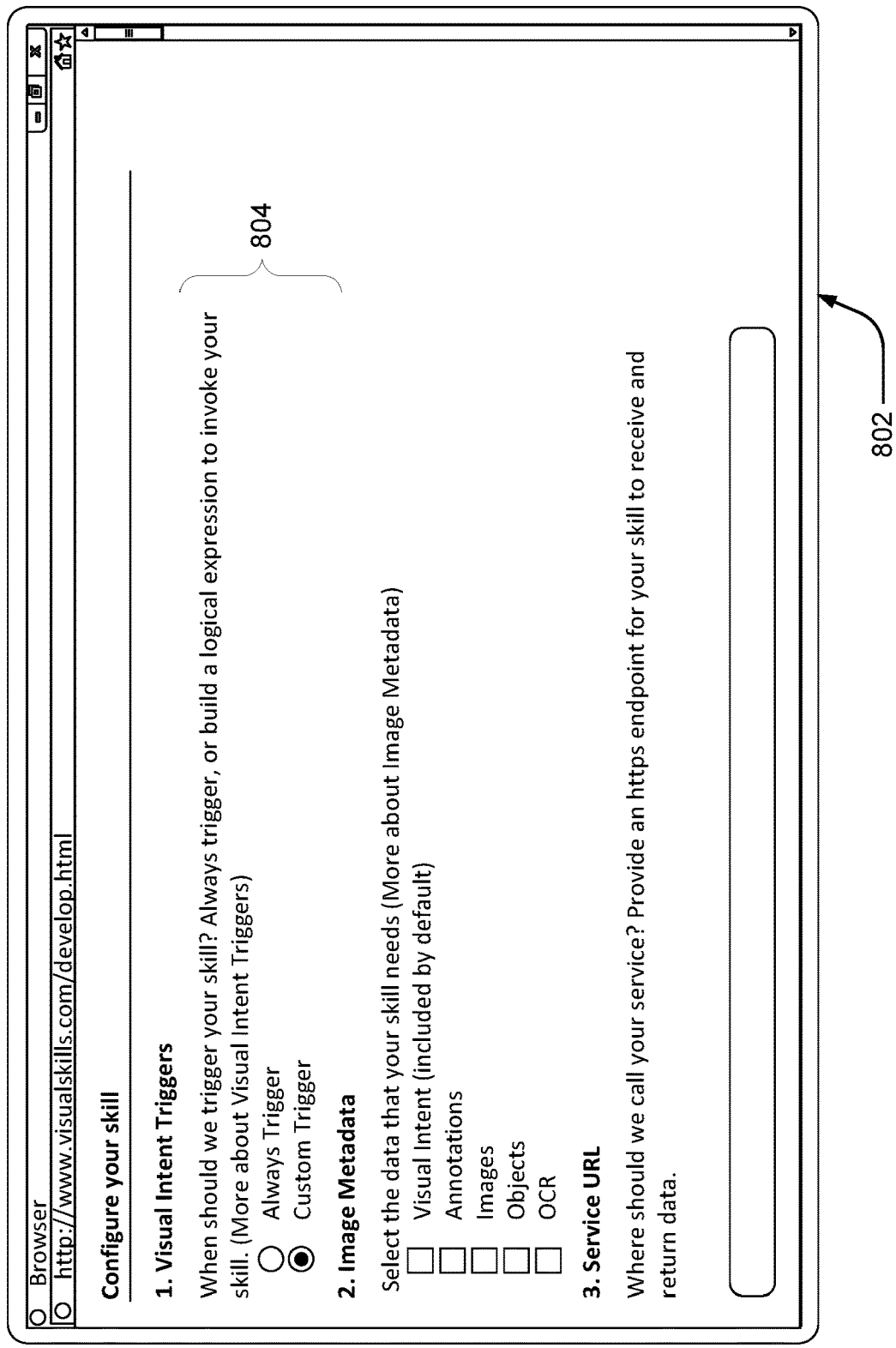

FIG. 7 illustrates a processing flow 700 among certain modules that can be used to implement the disclosed techniques. In FIG. 7, the modules include a client application 702, a search engine 704, a machine learning model 706, a skill triggering service 708, a Wrench World skill 710, a Wine World skill 712, and a Wheel World skill 714. Note that FIG. 7 shows a logical processing flow among the modules, and the modules can be distributed across different devices in various fashions. For example, in some cases, the search engine, machine learning model, and skill triggering service are co-located on a server or in a server farm run by a single entity. In other implementations, these modules can be run on different devices and by different entities. More generally, FIG. 7 covers implementations where all of the modules run on a single device, and also covers implementations where any or all of the modules are distributed across different devices.

Client application 702 can be a search engine application, a camera application, a browser, or any other application with the capability of identifying an image. For example, the client application can upload an image or an image identifier to search engine 704. The search engine can provide the image to a machine learning model 706, which can process the image to obtain image metadata describing the image. The image metadata can be provided to the search engine, which can use the metadata to identify search results that are related to the input images. The search results can be provided back to the client application.

The machine learning model 706 can also provide the metadata to skill triggering service 708. The skill triggering service can receive registration data from Wrench World skill 710, Wine World skill 712, and Wheel World skill 714. The registration data can include different triggering conditions that the skill triggering service compares to the image metadata. The skill triggering service can selectively trigger individual skills for which the metadata matches the triggering conditions.

In this case, assume both the Wrench World skill 710 and Wheel World skill 714 have been triggered, but not the Wine World skill 712. For each triggered skill, the skill triggering service 708 sends requested image metadata to that skill, e.g., via a skill triggering Uniform Resource Locator. Next, the triggered skills can respond to the skill triggering service 708 with skill trigger responses that can include text that the skill wants displayed, an image that the skill wants displayed (e.g., Wheel World icon 412 and Wrench World icon 416), and a clickthrough URL that the user can use to obtain skill outputs produced by the skill.

In some cases, the skill triggering URL and the clickthrough URL can resolve to the Internet Protocol ("IP") address of the same server that hosts a given skill, e.g., they may share the same domain name. For example, the skill triggering URL for the Wheel World skill 710 could be https://wheelworld.com/skill/endpoint, whereas the clickthrough URL could be the skill triggering URL with an added parameter specifying additional information, such as a parameter indicating a car model recognized by the Wheel World skill. Thus, the skill triggering URL may provide initial skill triggering functionality and be used each time the skill is triggered, whereas the clickthrough URL may provide a skill-based user experience more specific to the user's input image, as determined by the skill. In addition, note that the clickthrough URL can also be directed to a different domain than the skill triggering URL, e.g., the Wheel World skill could redirect the user to a web site with reviews of various wheels, etc.

Next, the skill triggering service 708 generates Wheel World graphical element 408 and Wrench World graphical element 410 and sends these graphical elements to the client application 702 for display. For example, the skill triggering service can map the Wheel World launch element 414 to the clickthrough URL provided by the Wheel World skill, and can map the Wrench World launch element 418 to the clickthrough URL provided by the Wrench World skill. In addition, the skill triggering service can render the text provided by the respective skills and include the rendered text in the respective skill elements, and also include images received from the respective skills in the respective skill elements as Wheel World icon 412 and Wrench World icon 416.

Now, the user of the client application 702 can select a particular skill, e.g., by clicking the Wheel World launch element 414. When the user does so, the client application can send a clickthrough request to the clickthrough URL previously provided by the Wheel World skill 714. In response, the Wheel World skill can send a skill clickthrough response to the client application. For example, the skill output can include the skill interface 502 shown in FIG. 5. Note also that the user may subsequently interact with the skill output sent via the clickthrough response to send further requests and obtain further results from the Wheel World skill. For example, when the user clicks third wheel option 508, the client application 702 can send an indication that this option has been clicked to the Wheel World skill at the clickthrough URL. In response, the Wheel World skill can update the skill interface as shown in FIG. 6. In some cases, activation of the clickthrough URL can cause the client device 102 to present the skill output directly within the client application 702, or open a browser window on the client device 102 to present the skill output. In other cases if the user is already in a browser application, a new tab can be opened upon activation of the clickthrough URL.

Note that processing flow 700 is exemplary and various alternatives are contemplated. For example, in the discussion above, the skill triggering service 708 provided the image metadata to the Wheel World skill after the skill was triggered, and before the user requested that the skill be invoked. In other implementations, the skill triggering service can delay providing some or all of the image metadata to triggered skills until a given skill is expressly invoked by the user. In the previous example, both the Wrench world skill 710 and the Wheel world skill 714 were triggered. By providing the image metadata to skills only after they are invoked by the client application 702, the skill triggering service can limit sharing of the image metadata with only those skills expressly requested by the user.

In addition, FIG. 7 shows an exemplary representation of functional relationships between different modules, but in practice certain modules can have overlapping functionality and/or be integrated into a single module. For example, search engine 704 can include machine learning model 706, and/or the machine learning model can be separate from the search engine. In addition, the search engine can include skill triggering service 708 and/or the skill triggering service can be separate from the search engine. In some cases, the machine learning model can include several different machine learning models that perform specific tasks, e.g., one machine learning model can detect people in images, another machine learning model can rank search results, and so on.

Machine Learning Model and Image Metadata

The machine learning model 706 can be implemented using various machine-learning technologies. In some implementations, the machine learning model is a deep learning model, e.g., a neural network with multiple processing layers that is trained to output different values characterizing an image and/or objects in the image. In other implementations, the machine learning model can be a support vector machine, a genetic algorithm, a probabilistic model such as a Bayesian model, etc.

The machine learning model 706 can perform various functions on input images. For example, the machine learning model can identify objects in the image and identify visually similar images. For objects that can be purchased, the machine learning model can provide recommendations of products that are visually similar to the objects in the input image. The machine learning model can also look at related text, e.g., that accompanies an image, and identify semantically-related images that are not necessarily visually similar to the input image. These visually similar items, related products, and/or semantically-related images can be provided to the search engine, which can forward these items as search results to client application 702.

In addition, as noted above, the machine learning model 706 can produce image metadata that can be shared with the search engine 704 and the skill triggering service 708. The image metadata can include visual intents, annotations, objects, optical character recognition ("OCR") results, and/or the images themselves. As noted previously, individual skills can select which types of image metadata that will be used by the skill for processing.

Visual intents can generally characterize the intent of a user based on the image. For example, the machine learning model 706 can determine various intent categories, such as animals, art, buildings and roads, transportation, etc. Then, given an image, the machine learning model can output which visual intents are implied by the image. For example, since image 202 includes car 204, the machine learning model can output a transportation visual intent. Likewise, since the image includes building 206, the machine learning model can output a buildings visual intent. Generally, visual intents can represent broad concepts that cover a range of specific user intents. For example, the transportation visual intent could mean anything the user might want to do involving transportation, from learning more about a particular car to travelling to a particular destination. Likewise, the building visual intent could mean anything the user might want to do that relates to a building, from learning more about the building's architectural characteristics to determining the latitude/longitude where the building is located.

In addition, the machine learning model 706 can automatically detect objects in a given image and perform identification of the detected objects. In some cases, the machine learning model can do entity recognition on certain objects, e.g., identify specific people, monuments, buildings, natural features such as mountains or lakes, etc. Thus, the image metadata generated by the machine learning model include object identifiers, e.g., "shirt," "car," and/or entity identifiers, e.g., "Mount Rushmore," "Chevy Cruze®," and so on. The machine learning model can also indicate which pixels in the image identify a given object. In some instances, the machine learning model can auto-crop one or more objects in a given image.

The image metadata can also include annotations, which include terms that describe what is present in the image. For example, the annotations could describe a shirt object as being yellow, short-sleeve, collarless, having a particular brand name, etc. In some cases, the image metadata can include the input image itself, e.g., the skill can request the image to perform further processing. As noted above, the metadata can also identify individual objects in a given image and also the pixel locations of those objects. The metadata can also identify OCR results of any text in the image, and, if the text is associated with a given object, the OCR results can be associated with that object.

As another example, the machine learning model 706 can identify the location where a given image was taken. For example, the machine learning model can determine the location from geolocation data included in the image, e.g., Exchangeable Image File Format ("EXIF") data. Alternatively, the machine learning model can determine the location by identifying visual features in the image, e.g., by detecting that the image includes the White House, the machine learning model can conclude that the image was taken in Washington, D.C. In some cases, the image may be accompanied by text, such as a caption on a webpage, comments in a social network post, etc., and the text can be used to infer the location where the image was taken. In any case, the image metadata can include the location where the image was taken when the machine learning model is able to determine the location.

In some implementations, the image metadata can provide values that conform to a taxonomy or ontology. For example, suppose a skill provider wishes to be triggered for any carnivorous animal, but not for omnivores or herbivores.

The image metadata can provide a high-level category of animals, and sub-categories indicating whether an annotation for a given animal indicates that the animal is a carnivore, herbivore, or omnivore. Note that other image metadata values, such as visual intents, can also be categorized using a taxonomy or ontology.

As noted further below, each skill can request specific types of image metadata that the skill would like to receive from the skill triggering service 708. For example, a skill that has its own image processing capability may prefer to request the image itself without other image metadata. On the other hand, a skill that lacks image processing capability may prefer to receive image metadata identifying all objects and annotations for those objects, but not to receive the image itself.

Triggering Conditions

In some implementations, skill developers specify which visual intents they would like to designate as triggering conditions. For example, a given image may have image metadata that triggers multiple skills. In the examples above, the Wheel World and Wrench World skills were both triggered by the presence of car 204 in image 202. This could reflect a scenario where both skills registered to be triggered by the transportation category.

In other implementations, different skills can be triggered by different objects in the same image. For example, as previously noted, image 202 includes building 206. The image metadata provided by machine learning model 706 could identify "Buildings" as another potential visual intent in the image, and there may be other skills registered to be triggered by the Buildings visual intent. For example, an architectural skill that identifies interesting architectural features could be triggered as well. In some implementations, the user could swipe left or right through the skills shown on the search results interface 402 of FIG. 4 to see what available skills have been triggered by the image that they selected.

In further implementations, users can provide multi-modal input. For example, suppose the user speaks or types the word "car" into their device in addition to identifying image 202. In this case, the spoken word "car" can be provided to the skill triggering service 708, which can pass the word on to the machine learning model 706. The machine learning model can infer from the word "car" that the user is likely not interested in architecture, and can thus omit the "Buildings" visual intent from the image metadata. As a consequence, the skill triggering service can decline to trigger the architectural skill even though the image itself would otherwise match the Buildings visual tent.

As another example, the multi-modal input can be used to further refine an intent. Suppose the user speaks or types the words "wheels for this car" into their device. In this case, the user's spoken words can help the skill triggering service 708 determine that the user is probably more interested in a skill such as Wheel World skill 714 and less interested in a skill such as Wrench World skill 710. In this case, the skill triggering service might rank multiple triggered skills against each other based on the spoken/text input. In other words, the visual intent determined by the machine learning model 706 is used to identify both skills to be triggered, and the additional voice/text input is used for ranking the triggered skills. The order in which the user swipes through different skills can correspond to the order in which the skills are ranked, e.g., the highest-ranked skills are shown in search results interface 402 initially, and the user can then swipe further and further to find progressively lower-ranked skills.

In further implementations, context and/or a user profile can be used to select which skills to trigger and/or to rank the order in which skills are presented. For example, suppose a user has provided image 202, and the user profile indicates the user has various architectural applications installed on their device, has visited various famous buildings, has searched the search engine for famous architecture, etc. In this case, the user's preferences from their profile can be used to disambiguate their visual intent and trigger the architectural skill instead of car-related skills, and/or rank the architectural skill over the car-related skills.

Device locations can also be used for skill triggering/ranking purposes. For example, suppose a user identifies an image with a picture of a horse. If the user is near a horse racing track, the skill triggering service 708 might trigger a skill associated with the race track, or a skill that provides information about horse racing. If the user is near a farm, the skill triggering service might trigger a skill about how to care for a horse, how to transport a horse, etc.

In further implementations, individual skills can be ranked based on other criteria, such popularity, user reviews, etc. In addition, skill developers can bid for their skills to be triggered for certain visual intents. Alternatively, skill developers can bid to be triggered by other values in the image metadata, e.g., for specific annotation values, specific entities, etc.

In further implementations, skill providers do not need to select visual intents from an existing list. Instead, the developers can provide keywords as triggering conditions, and image annotations can be semantically matched to those keywords. As an example, if a skill provider indicates the term "nature hike" is a keyword for triggering a hiking skill, then the skill triggering service 708 can parse through the annotations for input images to identify any images with semantically-similar concepts. For example, if a user inputs an image of Arches National Park, the machine learning model 706 might provide an annotation such as "outdoors trip." The skill triggering service can map the annotation "outdoors trip" and the keyword "nature hike" to a semantic space, determine that the terms are relatively close in the semantic space, and trigger the skill accordingly.

In further implementations, skill providers can implement their own skill triggering models. For example, a skill provider can provide image processing code that evaluates input images and outputs a Boolean yes/no value indicating whether the skill should be triggered. In some cases, the skill provider may send the image processing code to be run remotely from the skill itself and together with search engine 704 and/or machine learning model 706, e.g., on a server.

In further implementations, the custom triggering code may only have limited access to the image itself. For example, the skill triggering service 708 can prevent the custom triggering code from sending the image to the server hosting the skill. This can provide some privacy guarantees where users might not want third parties to see their private images.

Skill Processing

As noted above, each skill can register by providing a resource locator where the image metadata should be sent when the skill is triggered. In addition, the skill can designate what type of image metadata it would like to receive, and also what triggering conditions should cause the skill to trigger. Consider the Wheel World skill 714, for example. As noted, this skill can trigger on a transportation visual intent, which can be provided to the Wheel World skill at the designated skill triggering URL.

Each skill can also register for various annotations describing any object in the image. Considering image 202, Wheel World skill 714 might receive annotations describing the car as well as the building. The annotations can be object-specific. For instance, annotations describing the building could characterize the number of stories, the latitude/longitude, address, year the building was built, business that are present in the building, etc. Annotations describing the car could characterize the car year, make, and model, the color, the trim level, etc. The Wheel World skill could parse through the annotations to extract any annotations describing cars, and discard any unrelated annotations. In other implementations, the Wheel World skill can specify what types of annotations it wants to receive, e.g., only car-related annotations, and the skill triggering service 708 can filter any unrelated annotations out before triggering the Wheel World skill.

As noted, each skill can also request the image itself, and/or portions of the image containing objects of interest. For example, the Wheel World skill 714 may implement custom image recognition of vehicles or parts of vehicles, e.g., wheels. For example, the Wheel World skill can choose to receive the entire image and identify the wheels in the image using the skill code. Alternatively, the Wheel World skill can request that the machine learning model 706 identify specific objects in the images and the pixels where those objects are located. Thus, for instance, the machine learning model can give the Wheel World skill a bounding box around the car, around each wheel, etc., and this can reduce the processing burden for Wheel World's wheel recognition processing.

In addition, each skill can request optical character recognition of any text in the image. For instance, if a vehicle has a license plate from a particular state, the machine learning model 706 can provide text indicating what state the vehicle is from. The Wheel World skill 714 can have code that determines what wheels are popular in that state, and rank proposed wheels accordingly.

Alternative Implementations

FIGS. 1-4 show a scenario where the user initially accesses the Wheel World skill 714 via a local search application before subsequently being directed to the skill interface 502 shown in FIG. 5. However, this is for exemplary purposes only, and the user can access skills via many different types of applications. For example, in some cases, the user may access skills using a camera application, e.g., the user can be presented with an option to request a visual search immediately after taking a picture with the camera. If the user requests the visual search, then the user can view visual search results as well as triggered skills within the camera application.

As another example, note that the discussion above provides for the user drawing the bounding box 302 manually. In other implementations, the machine learning model 706 can automatically identify specific objects in an input image and draw bounding boxes around these identified objects. Then, the skill triggering service 708 can trigger different skills for each of the identified objects. As another alternative, the user can select one or more of the identified objects before any skills are triggered, and the skill triggering service can trigger skills based only on those objects that were selected by the user.

As another example, some implementations may integrate with a snipping tool. Generally, a snipping tool can allow a user to select any part of a graphical user interface currently being shown on a device, e.g., the user can select image content from part or all of one or more windows, a desktop, etc. The snipping tool can provide a visual search option that performs a visual search based on any content snipped by the user, and the skill triggering service 708 can selectively trigger skills based on the snipped content.

Development Process

The developer of a given skill can develop the skill using interfaces illustrated in FIGS. 8-13. First, the developer can visit a website using a browser and be presented with a web page 802, shown in FIG. 8. Web page 802 can include various sections discussed further herein. First, the web page can include a trigger section 804 that allows the developer to specify what conditions will cause the skill to be triggered. Here, the developer can select between always trigger or custom trigger. If the developer selects always trigger, the skill is always presented to the user of the client device. If the developer selects custom trigger, the developer can specify conditions under which the skill is presented to the user.

Figure 9:
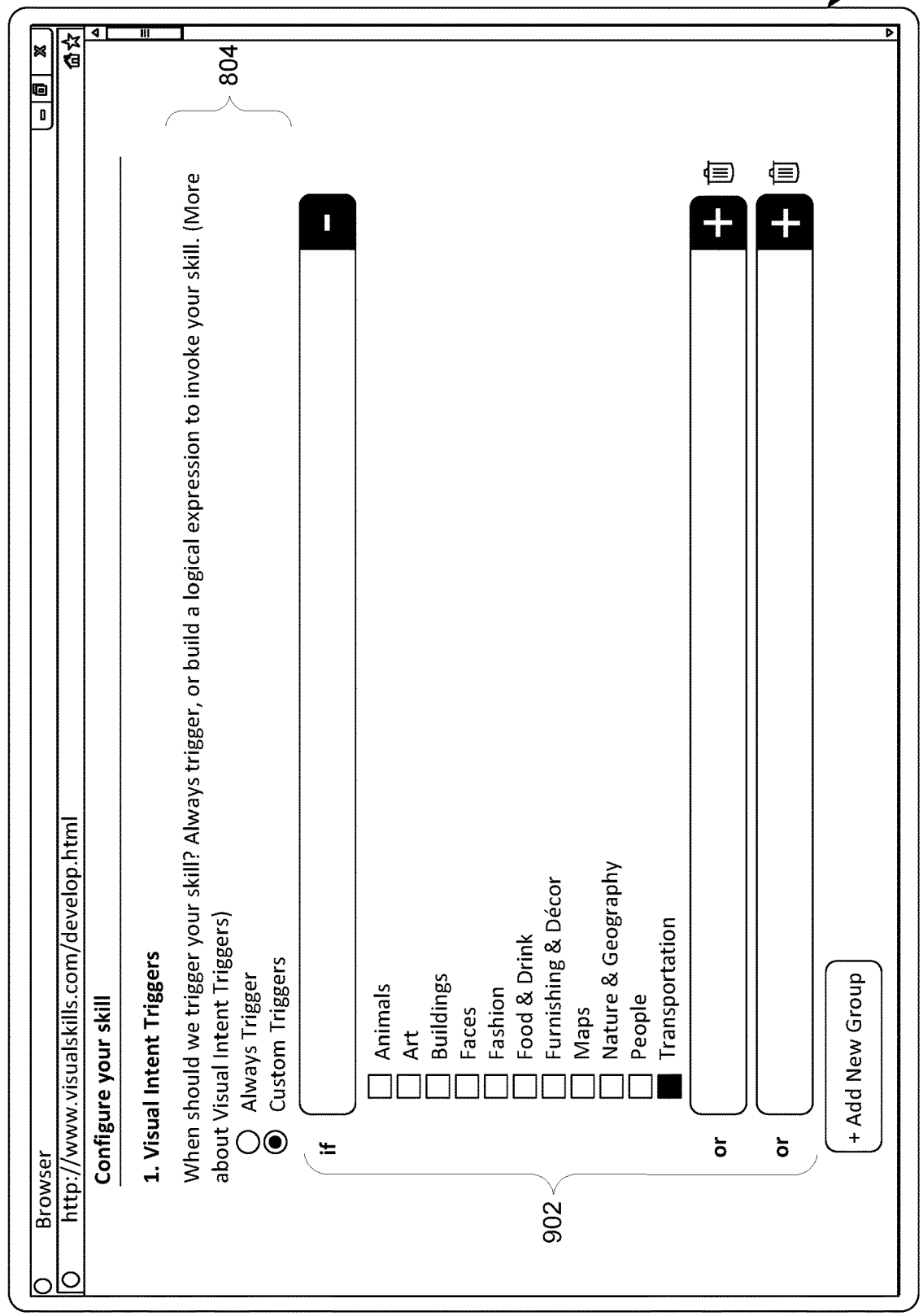

Assuming the developer specifies custom trigger, the web page 802 can appear as shown in FIG. 9, with custom trigger options section 902. Here, the user can select from various visual intents identified by the search engine from a given image. For example, the developer of the Wheel World skill might select transportation as a triggering visual intent. A developer of a skill about endangered species might select to trigger on an animals visual intent or a nature & geography visual intent, and so on.

Figure 10:
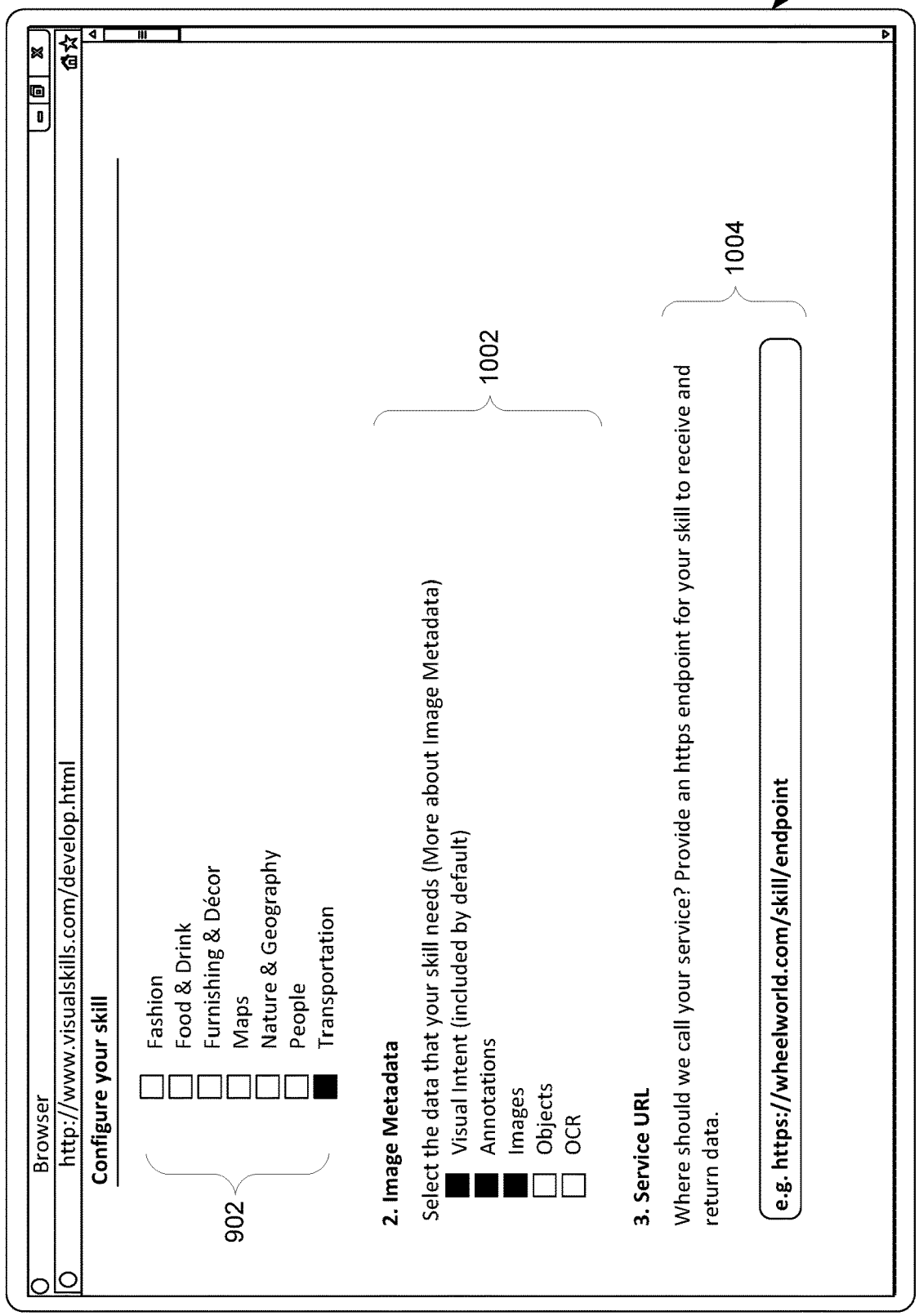

After selecting how to trigger the skill, the web page 802 may appear as shown in FIG. 10. Next, the developer may select specific image metadata fields that the skill will use for processing via image metadata section 1002, which allows the developer to select from visual intents, annotations, the image files themselves, objects identified in the images, and/or optical character recognition of any text in the input images. Here, the developer is shown requesting the visual intent image metadata, the image itself, and annotations.

Next, the developer can input a skill triggering URL in URL section 1004. When a given skill is triggered by the skill triggering service 708, the skill triggering service sends the selected metadata to the skill triggering URL.

Figure 11:
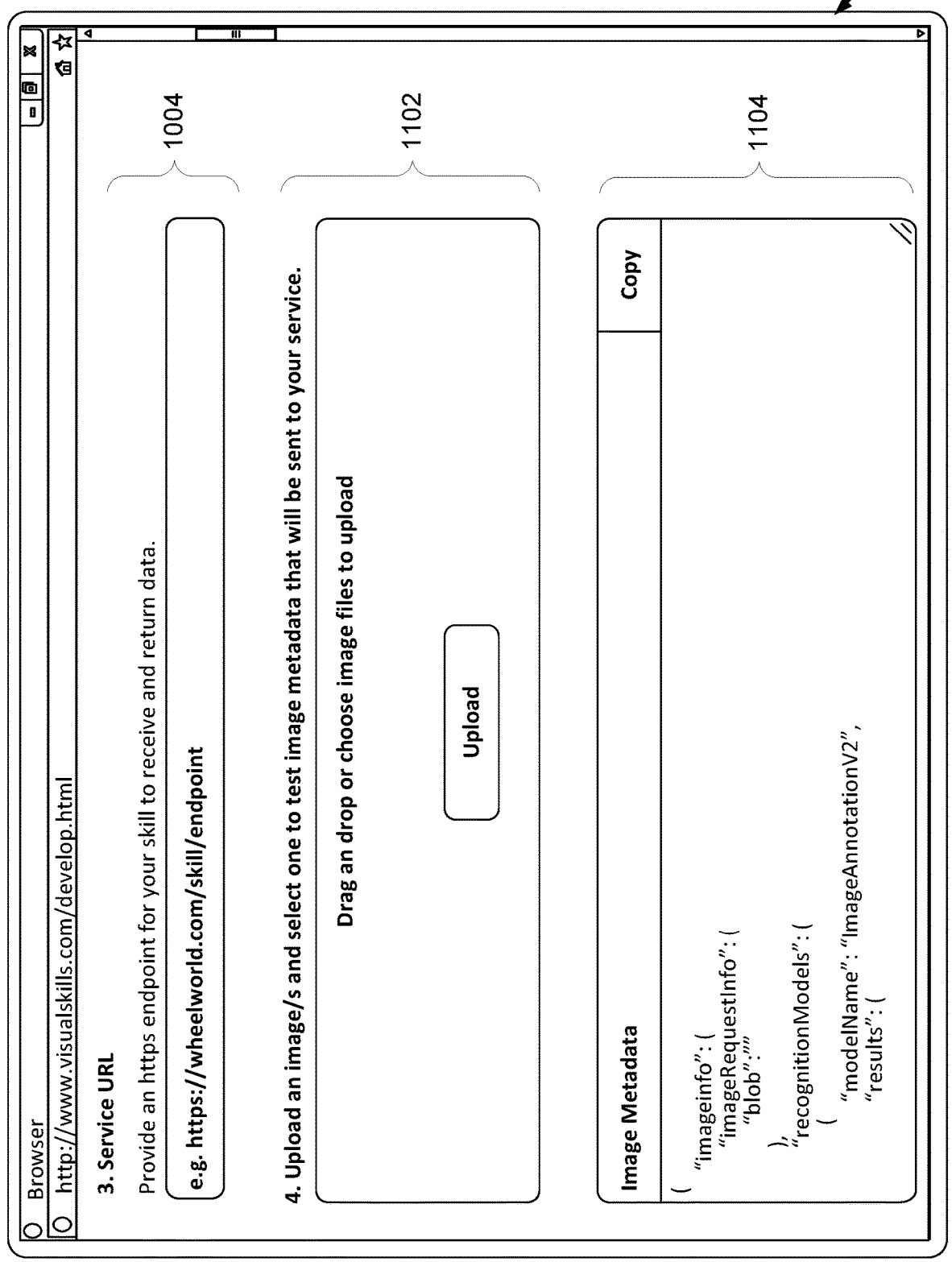

FIG. 11 illustrates further sections of web page 802 not shown previously, e.g., as the developer scrolls down through the web page. Next, the developer can upload an image in image upload section 1102. The skill triggering service 708 can provide the image to the machine learning model 706, which can process the image to obtain image metadata. The image metadata can be displayed to the developer in image metadata section 1104.

Figure 12:
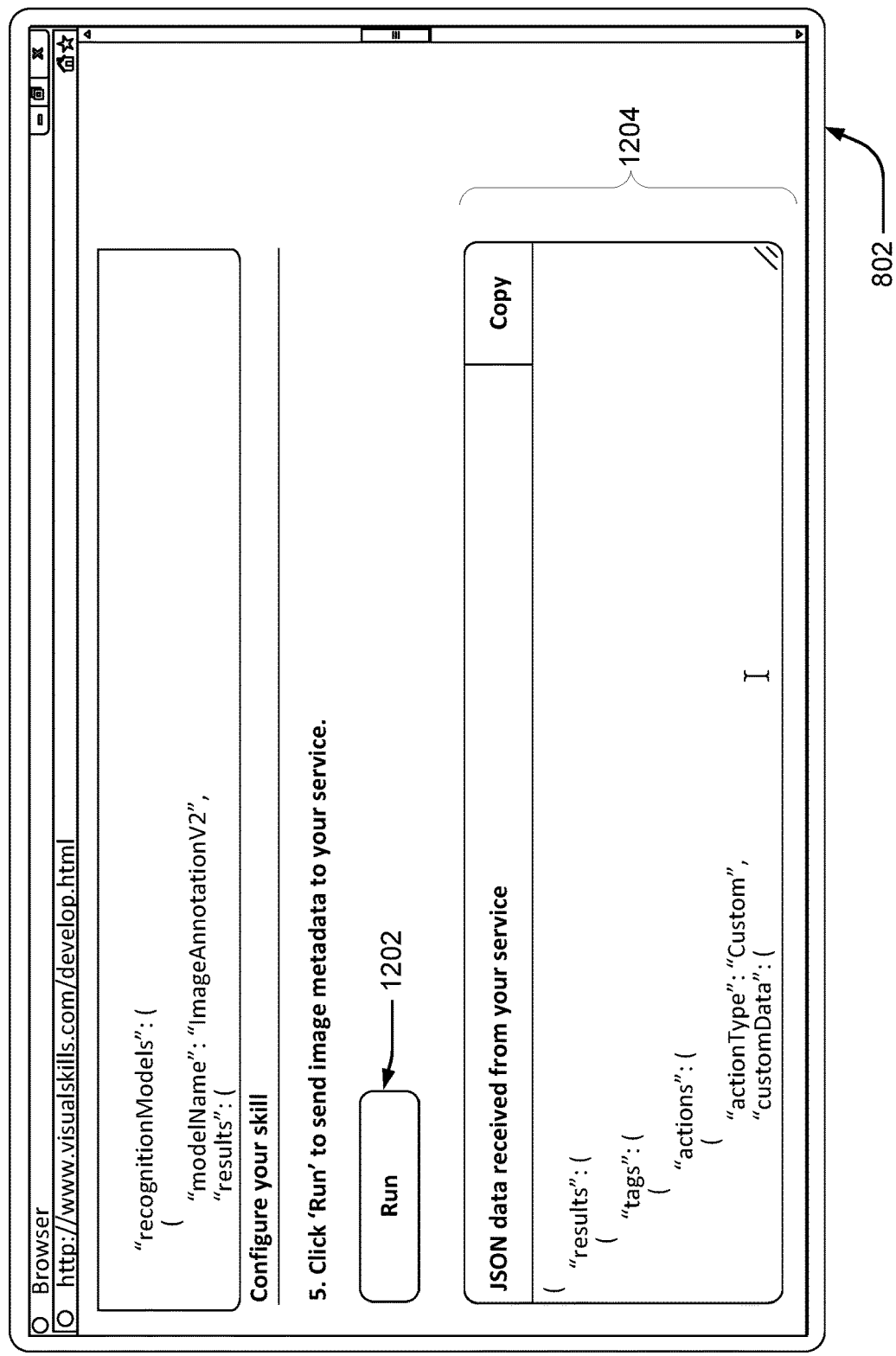

FIG. 12 illustrates further sections of the web page not shown previously, as the developer continues the development process. FIG. 12 shows a run button 1202 which causes the skill triggering service 708 to trigger the skill, e.g., by sending the selected image metadata to the designated skill triggering URL. The skill can respond with data shown in a skill trigger response section 1204. In some cases, the image metadata and/or the skill trigger response data can be in a standardized format, e.g., as a Javascript Object Notation ("JSON") object. The image metadata and/or skill trigger response data can be communicated using various protocols, e.g., as a Hypertext Transfer Protocol ("HTTP") post request sent using Transmission Control Protocol ("TCP") over Internet Protocol ("IP").

Figure 13:
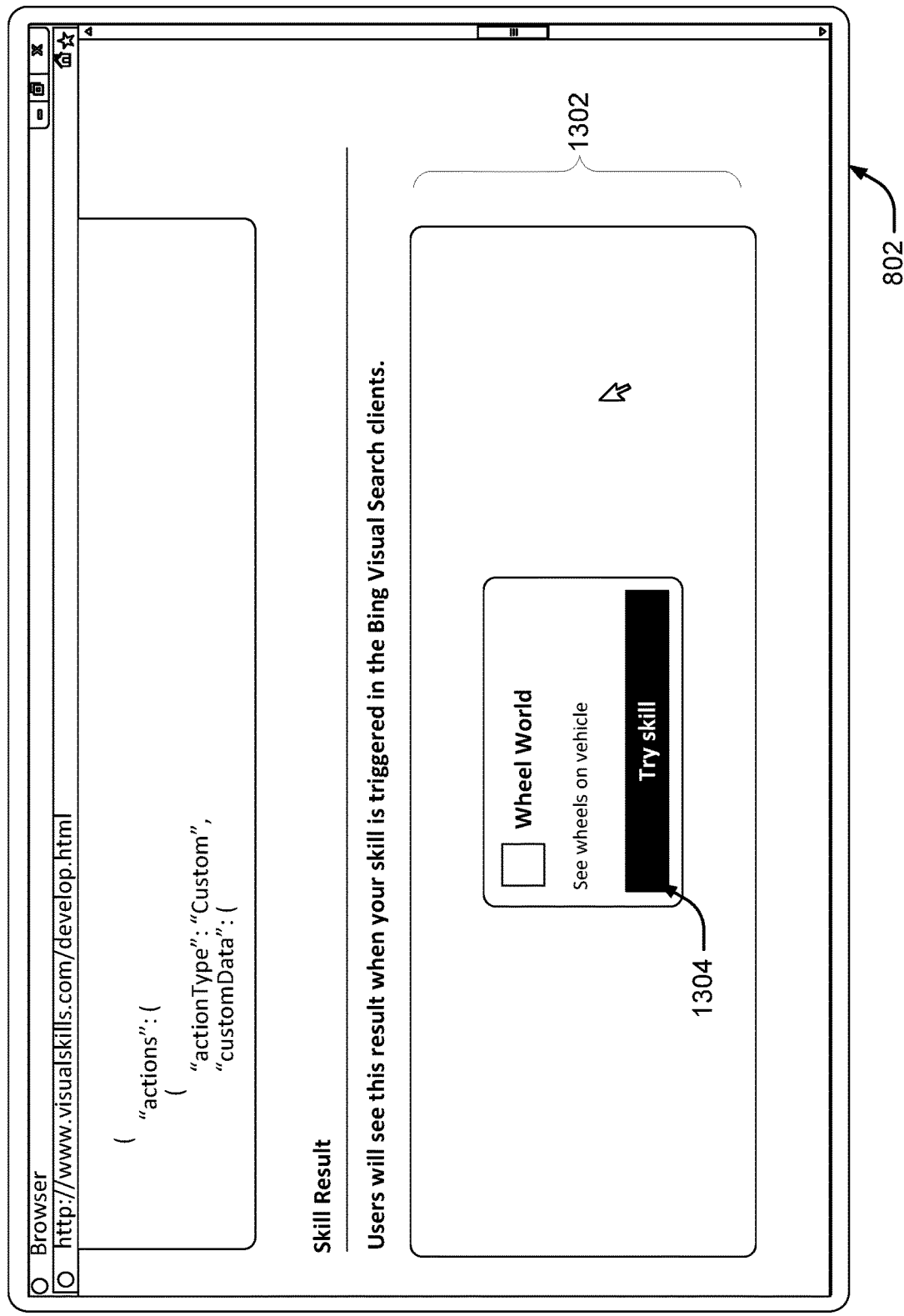

FIG. 13 illustrates further sections of the web page not shown previously, as the developer continues. Here, the skill invocation section 1302 allows the developer to invoke their skill by clicking on skill launch element 1304. Upon invoking the skill, the developer can interact with the skill via the skill clickthrough URL as shown in previously in FIGS. 4-6 and discussed above.

Example System

Figure 14:
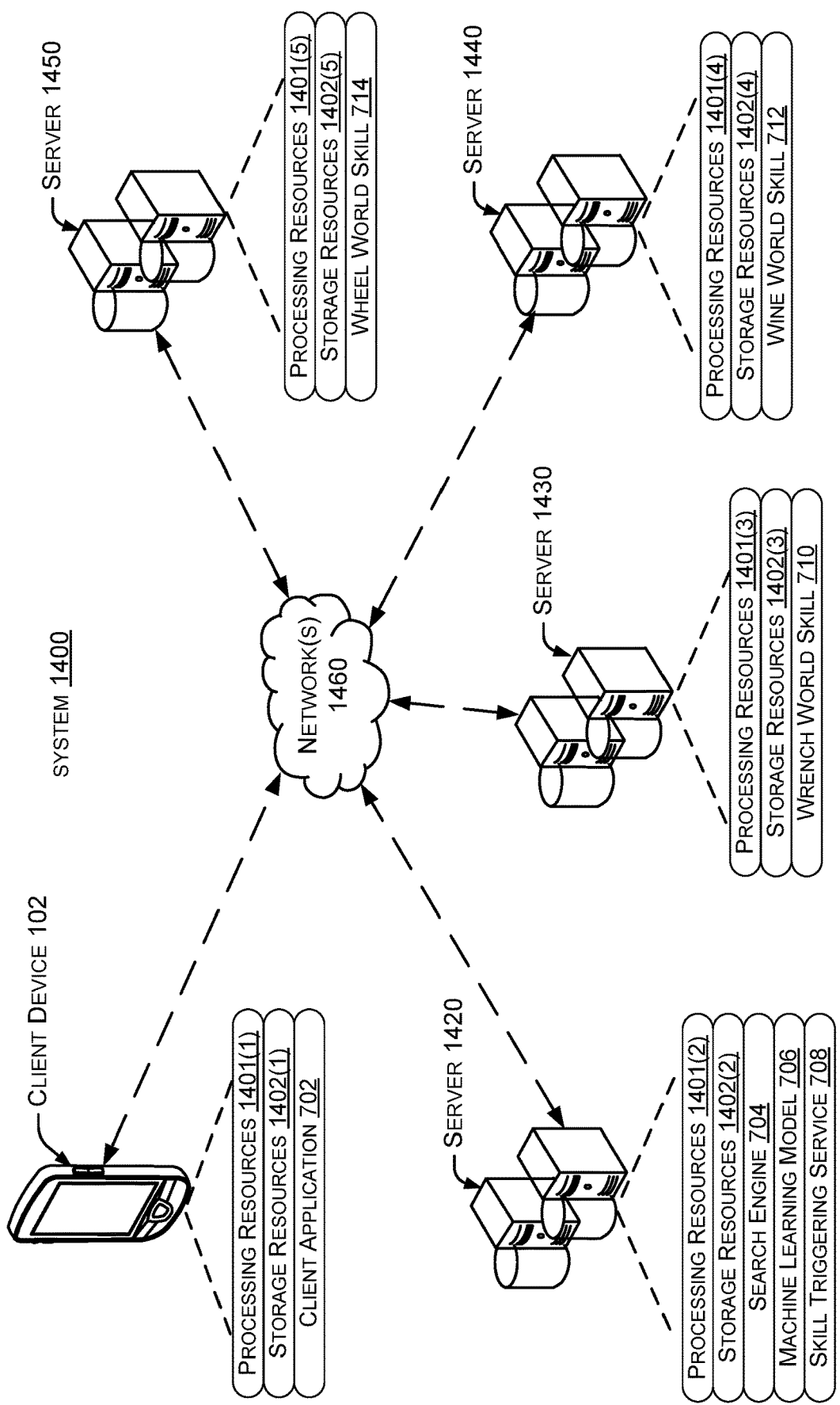
FIG. 14 illustrates an exemplary system that is consistent with some implementations of the present concepts.

The present implementations can be performed in various scenarios on various devices. FIG. 14 shows an example system 1400 in which the present implementations can be employed, as discussed more below.

As shown in FIG. 14, system 1400 includes client device 102, a server 1420, a server 1430, a server 1440, and a server 1450, that can each communicate with each other over a network 1460. Note that a client device can be embodied both as a mobile device as shown in FIG. 14, as well as stationary devices such as desktops, server devices, etc. Likewise, a server can be implemented using various types of computing devices. In some cases, any of the devices shown in FIG. 14, but particularly the servers, can be implemented in data centers, server farms, etc.

Certain components of the devices shown in FIG. 14 may be referred to herein by parenthetical reference numbers. For the purposes of the following description, the parenthetical (1) indicates an occurrence of a given component on client device 102, (2) indicates an occurrence of a given component on server 1420, (3) indicates an occurrence on server 1430, (4) indicates an occurrence on server 1440, and (5) indicates an occurrence on server 1450. Unless identifying a specific instance of a given component, this document will refer generally to the components without the parenthetical.

Generally, the devices 102, 1420, 1430, 1440, and/or 1450 may have respective processing resources 1401 and storage resources 1402, which are discussed in more detail below. The devices may also have various modules that function using the processing and storage resources to perform the techniques discussed herein, as discussed more below. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 102 can include instances of a client application 702. The client application can provide various types of functionality. For example, as noted above, the client application can be a search app, a camera app, a browser app, etc. Generally, any application can serve as a client application with the disclosed techniques as long as the user can navigate within the application to identify an image of interest.

Server 1420 can include search engine 704, machine learning model 706, and skill triggering service 708. As discussed above, the search engine can provide a visual search functionality that processes input images received from or selected by the client devices. The skill triggering service can selectively trigger individual skills based on image metadata output by the machine learning model, and can also provide the image itself and/or the image metadata to each triggered skill. The skill triggering service can also provide development functionality, e.g., as shown above in FIGS. 8-13. Generally, the development functionality can allow skill developers to develop skills, set triggering conditions for triggering the skills, etc., as discussed elsewhere herein. In some implementations, the development functionality is provided via a skill development portal, e.g., a web service that presents the interfaces shown in FIGS. 8-13 as web pages accessible remotely over network 1460.

Servers 1430, 1440, and 1450 can include respective skills 710, 712, and 714 discussed above. Note that these skills are exemplary and can correspond to any skill that a developer chooses to provide. When triggered by the skill triggering service 708 and/or invoked by client application 702, each skill can execute local skill code on its respective server. Server 1420 can provide the client device 102 with search engine results determined by the search engine 704 and also with graphical elements for invoking skills, clickthrough URLs, and/or text specified by the skill developer for display. Servers 1430, 1440, and 1450 can provide the client device with skill outputs for any invoked skills.

Example Skill Triggering Method

Figure 15:
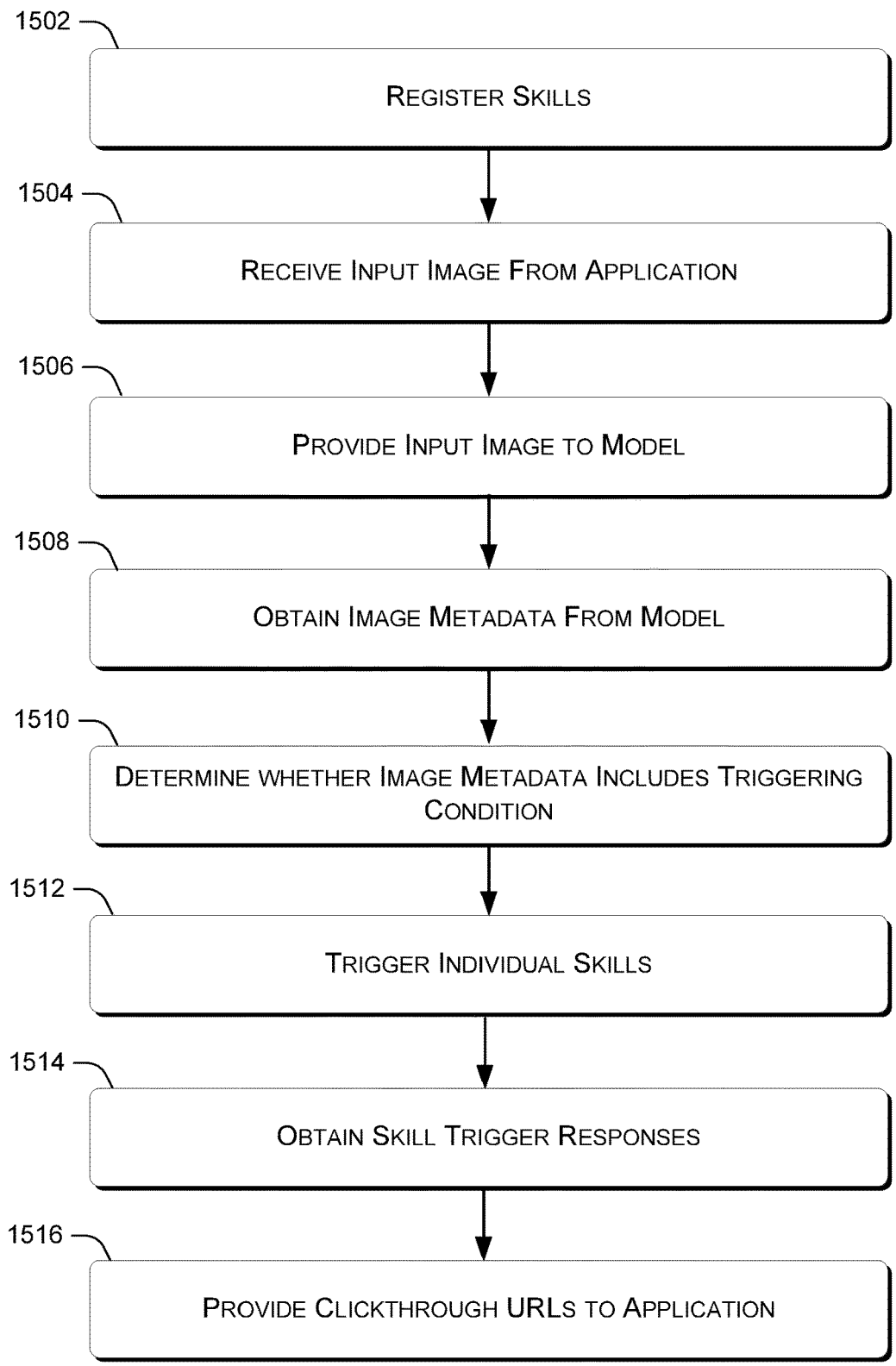
FIGS. 15 and 16 illustrate exemplary methods or techniques that are consistent with some implementations of the present concepts.

The following discussion presents an overview of functionality that can allow image-based skill triggering to be performed. FIG. 15 illustrates an exemplary method 1500, consistent with the present concepts. Method 1500 can be implemented by a single device, e.g., server 1420, or can be distributed over one or more servers, client devices, etc. Moreover, method 1500 can be performed by one or more modules, such as skill triggering service 708.

At block 1502, one or more skills are registered. For example, a skill developer can register a skill with registration data identifying one or more triggering conditions, requested image metadata fields, and/or a skill triggering resource locator where the image metadata should be sent to the skill when the skill is triggered. For example, the skill triggering resource locator can be a uniform resource locator (URL) that resolves to a network address of server 1430, 1440, or 1450.

At block 1504, an input image is received. For example, a user of client device 102 can designate a locally-stored image, or an image available remotely, e.g., via an image URL. The input image can be identified and/or provided to the skill triggering service 708.

At block 1506, the image is provided to a machine learning model, such as machine learning model 706. As noted above, the machine learning model can be a deep machine learning model that outputs various information about the image as image metadata.

At block 1508, the image metadata can be obtained from the machine learning model by the skill triggering service 708. As noted previously, the image metadata can include visual intents, annotations, identified objects, OCR results, and/or the input image itself.

At block 1510, the image metadata can be evaluated to determine whether image metadata includes values that match triggering conditions specified by skills. For example, the skill triggering service 708 can determine whether the image metadata includes any visual intents, annotations, entities, or other values that match registered triggering conditions.

At block 1512, one or more skills can be triggered. For example, the skill triggering service 708 can trigger any or all skills that registered triggering conditions that match values in the image metadata. The skill triggering service can also send specific image metadata values for the requested image metadata fields to the triggered skills.

At block 1514, skill trigger responses can be obtained. For example, individual skills can process the image metadata and send skill trigger responses to the skill triggering service 708. The skill trigger responses can include clickthrough URLs identifying network locations where the skill can be accessed by the client device 102.

At block 1516, the skill triggering service can associate the clickthrough URLs with launch elements included in graphical elements, and provide the graphical elements and clickthrough URLs to the client application 702. If the user clicks the launch element for a given skill, the skill can send skill output data to the application via a clickthrough response, as discussed above with respect to FIG. 7.

Note that method 1500 is discussed above as being performed by skill triggering service 708 on server 1420. However, method 1500 can be implemented on many different types of devices, e.g., by one or more cloud servers, by a client device such as a laptop, tablet, or smartphone, etc.

Also, note that the aforementioned discussion distinguishes between a skill triggering URL and a clickthrough URL. As noted above, these URLs can share a domain, e.g., both resolve to the same network address of a server hosting a given skill. The skill triggering URL can be used by the skill triggering service 708 each time the skill is triggered. The skill can generate a clickthrough URL for each received image to take the user to a customized experience that includes output generated by the skill for a given input image. As previously noted, the clickthrough URL can also the user to a different domain for presentation of skill-specific output data, and can include one or more skill-determined parameters that are provided via the clickthrough URL.

Example Skill Development and Processing Method

Figure 16:
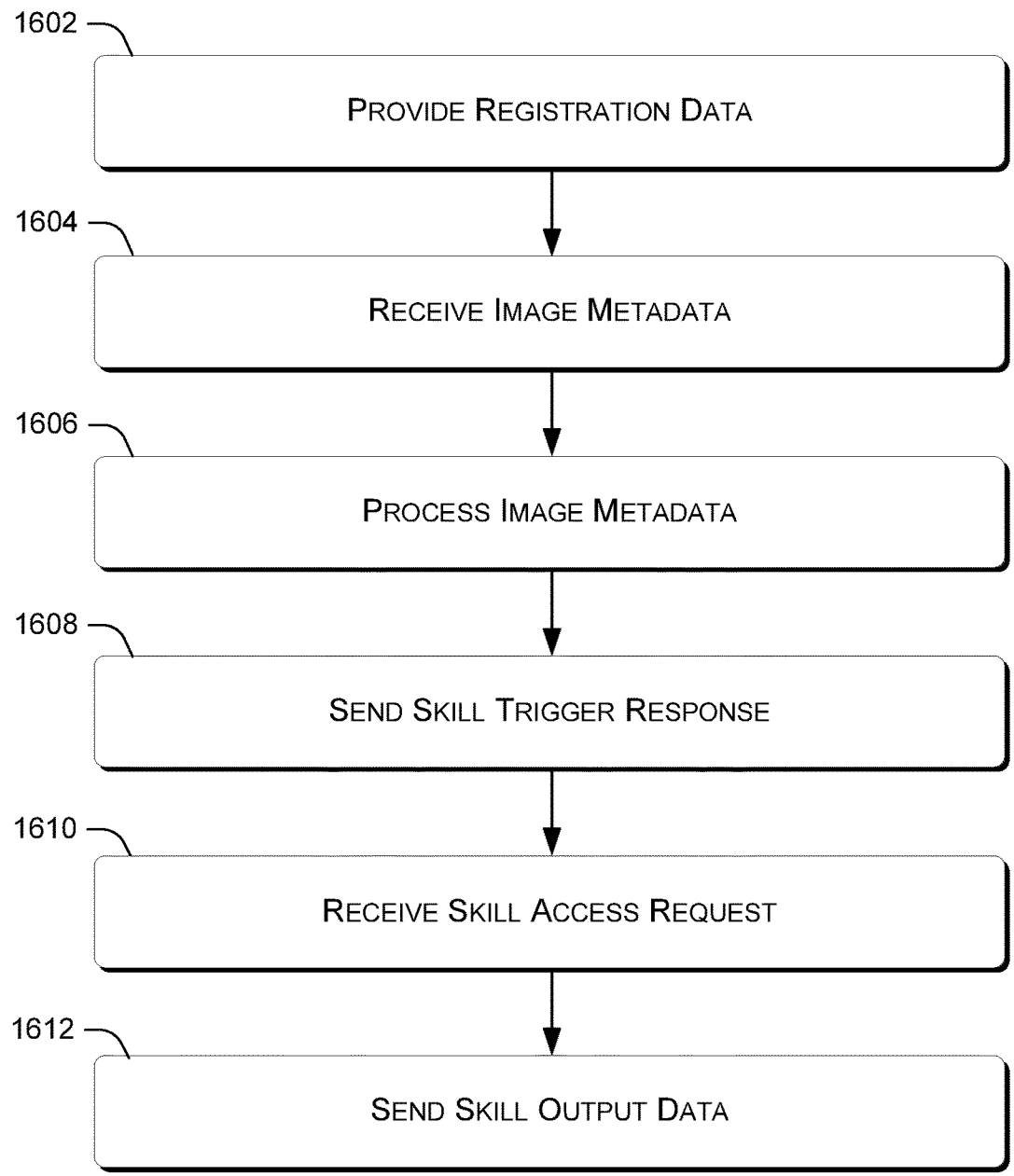

The following discussion presents an overview of functionality that can allow skill development and processing to be performed. FIG. 16 illustrates an exemplary method 1600, consistent with the present concepts. Method 1600 can be implemented by a single device, e.g., servers 1430, 1440, and/or 1450, or can be distributed over one or more servers, client devices, etc. Moreover, method 1600 can be performed by one or more modules, such as skills 710, 712, and/or 714 and/or a browser or other application used by a skill developer.

At block 1602, registration data is provided to skill triggering service 708. For example, a skill developer can use the browser to visit web page 802, which can be hosted on server 1420. As noted, the registration data can include identify one or more triggering conditions, requested image metadata, and/or a skill triggering resource locator where the skill code will execute. For example, the skill triggering resource locator can be a uniform resource locator (URL) that resolves to an IP address of server 1430, 1440, or 1450.

At block 1604, the skill can obtain image metadata. For example, skill code implementing a given skill can be provided at the skill triggering URL identified in the registration data. The skill code can receive the image metadata from skill triggering service over network 1460.

At block 1606, the image metadata can be processed with the skill. For example, the skill can provide various data sets or algorithms that extend the functionality of the search engine 704 and/or machine learning model 706. A skill output can be generated, as well as a clickthrough URL where the application can access the skill output.

At block 1608, a skill trigger response is sent to the skill triggering service 708. For example, the skill trigger response can include any text or images to be presented by the skill triggering service in a graphical element. The skill trigger response can also include the clickthrough URL where the skill output can be obtained by the client device 102.

At block 1610, a skill access request is received from the client device 102 at the clickthrough URL. For example, the client device can send the skill access request directly to the skill, or can send the request through the skill triggering service 708.

At block 1612, a skill clickthrough response with skill output data is sent to the client device 102. For example, the skill can send the skill output data directly to the client device, or can send the skill output data to the client device through the skill triggering service 708. Exemplary skill output data is shown above in FIGS. 5 and 6.

Note that method 1600 can be performed on different devices. In one specific scenario, a skill developer uses a web browser to perform block 1602, e.g., on a laptop or desktop device. Blocks 1604-1610 can then be performed by the respective device on which the skill code is hosted.

Device Implementations

As noted above with respect to FIG. 14, system 1400 includes several devices, including a client device 102 and servers 1420, 1430, 1440, and 1450. As also noted, not all device implementations can be illustrated, and other device implementations should be apparent to the skilled artisan from the description above and below.

The term "device", "computer," "computing device," "client device," "server," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc. For example, a "skill triggering system" can include one or more devices that perform skill triggering, such as server 1420.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods described herein can be performed on a single computing device and/or distributed across multiple computing devices that communicate over network(s) 1460. Without limitation, network(s) 1460 can include one or more local area networks (LANs), wide area networks (WANs), the Internet, and the like.

ADDITIONAL EXAMPLES

Various device examples are described above. Additional examples are described below. One example includes a method performed on a computing device. The method can include registering a plurality of skills with associated triggering conditions, receiving an input image, and obtaining image metadata for the input image. The image metadata can include image metadata values determined by a machine learning model based at least on an analysis of the input image. The method can also include determining whether the image metadata values determined by the machine learning model match an individual triggering condition for an individual skill, and, responsive to determining that the image metadata values determined by the machine learning model match the individual triggering condition for the individual skill, triggering the individual skill.

Another example can include any of the above and/or below examples where the input image is received from an application, wherein the triggering the individual skill includes sending a graphical element to the application, and the graphical element has a launch element selectable to invoke the individual skill.

Another example can include any of the above and/or below examples where the method further includes receiving a clickthrough resource locator from the individual skill and providing the clickthrough resource locator to the application, wherein the launch element, when selected, causes the application to access the individual skill via the clickthrough resource locator.

Another example can include any of the above and/or below examples where the machine learning model is a deep machine learning model that includes multiple processing layers.

Another example can include any of the above and/or below examples where the method includes providing at least some of the image metadata to the individual skill.

Another example can include any of the above and/or below examples where the method further includes receiving registration data for the individual skill, and the registration data identifies requested image metadata fields for the individual skill. The method can further include providing specific image metadata values for the requested image metadata fields to the individual skill when the individual skill is triggered.

Another example can include any of the above and/or below examples where the method further includes providing a skill development portal and receiving, at the skill development portal, the registration data.

Another example can include any of the above and/or below examples where the registration data including a resource locator for the individual skill, and the method further includes sending the specific image metadata values to the individual skill via the resource locator.

Another example can include any of the above and/or below examples where the registration data identifies the individual triggering condition.

Another example includes a skill triggering system comprising a hardware processing unit and a storage resource storing computer-readable instructions which, when executed by the hardware processing unit, cause the hardware processing unit to: obtain input images identified by a plurality of client devices, obtain image metadata describing content of the input images, and selectively trigger different skills for different client devices based at least on the image metadata. The image metadata can be provided by a machine learning model Another example can include any of the above and/or below examples where the computer-readable instructions, when executed by the hardware processing unit, cause the hardware processing unit to obtain skill triggering resource locators identifying different network locations where the different skills are hosted and send at least some of the image metadata to the skill triggering resource locators.

Another example can include any of the above and/or below examples where the computer-readable instructions, when executed by the hardware processing unit, cause the hardware processing unit to receive skill trigger responses from the different skills, the skill trigger responses including clickthrough resource locators and send the clickthrough resource locators to the plurality of client devices.

Another example can include any of the above and/or below examples where the image metadata identifies respective visual intents inferred by the machine learning model from the input images, and the different skills are triggered based at least on the respective visual intents.

Another example can include any of the above and/or below examples where the computer-readable instructions, when executed by the hardware processing unit, cause the hardware processing unit to obtain registration data for the different skills, where the registration data identifies different triggering conditions for the different skills, and selectively trigger respective skills when the image metadata includes individual image metadata values that match corresponding triggering conditions for the respective skills.

Another example can include any of the above and/or below examples where the computer-readable instructions, when executed by the hardware processing unit, cause the hardware processing unit to process the input images using the machine learning model.

Another example can include any of the above and/or below examples where the computer-readable instructions, when executed by the hardware processing unit, cause the hardware processing unit to execute a search engine that is configured to process the input images as search queries to identify search results and send the search results to the plurality of client devices.

Another example includes a method that includes providing registration data for a particular skill to a skill triggering service, where the registration data can include a triggering condition specifying when the particular skill should be triggered and a resource locator of the particular skill. The method can also include receiving, at the resource locator, image metadata for an image from the skill triggering service, and the image metadata can include image metadata values determined by a machine learning model. The method can also include processing the image metadata using the particular skill.

Another example can include any of the above and/or below examples where the method further includes generating skill output reflecting the processing of the image metadata with the particular skill and sending the skill output to an application on a client device.

Another example can include any of the above and/or below examples where the registration data specifies a subset of available image metadata values requested by the particular skill.

Another example can include any of the above and/or below examples where the method further includes providing image processing code to the skill triggering service, and the image processing code is configured to analyze different images and determine whether the triggering condition is met.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:
   registering a plurality of skills with associated triggering conditions, individual triggering conditions designating individual skills for triggering based at least on objects visually depicted in input images;
   receiving a particular input image;
   obtaining image metadata for the particular input image, the image metadata comprising a particular image metadata value determined by a machine learning model based at least on an analysis of the particular input image, the particular image metadata value describing a particular object that is visually depicted in the particular input image;
   determining whether the particular image metadata value determined by the machine learning model matches the triggering conditions; and
   responsive to determining that the particular image metadata value determined by the machine learning model matches a particular triggering condition for a particular skill, triggering the particular skill.

2. The method of claim 1, the particular input image being received from an application, wherein the triggering the particular skill comprises sending a graphical element to the application, the graphical element having a launch element selectable to invoke the particular skill.

3. The method of claim 2, further comprising:
   receiving a clickthrough resource locator from the particular skill; and
   providing the clickthrough resource locator to the application, wherein the launch element, when selected, causes the application to access the particular skill via the clickthrough resource locator.

4. The method of claim 1, the machine learning model being a deep machine learning model comprising multiple processing layers.

5. The method of claim 1, further comprising:
   providing the particular image metadata value to the particular skill.

6. The method of claim 5, further comprising:
   receiving registration data for the particular skill, the registration data identifying requested image metadata fields for the particular skill; and
   providing the requested image metadata fields for the particular input image to the particular skill when the particular skill is triggered.

7. The method of claim 6, further comprising:
   providing a skill development portal; and
   receiving, at the skill development portal, the registration data.

8. The method of claim 7, the registration data including a resource locator for the particular skill, the method further comprising:
   sending the requested image metadata fields for the particular input image to the particular skill via the resource locator.

9. The method of claim 6, the registration data identifying the particular triggering condition.

10. A skill triggering system comprising:
    a hardware processing unit; and
    a storage resource storing computer-readable instructions which, when executed by the hardware processing unit, cause the hardware processing unit to:
    receive requests to register skills to be triggered when specified visual intents are visually depicted in input images that are subsequently received by the skill triggering system;
    receive the input images from a plurality of client devices;
    obtain image metadata describing content that is visually depicted in the input images, the image metadata being provided by a machine learning model; and
    selectively trigger different skills for different client devices based at least on whether the image metadata matches the specified visual intents.

11. The skill triggering system of claim 10, wherein the computer-readable instructions, when executed by the hardware processing unit, cause the hardware processing unit to:
    obtain skill triggering resource locators identifying different network locations where the different skills are hosted; and
    send at least some of the image metadata to the skill triggering resource locators.

12. The skill triggering system of claim 10, wherein the computer-readable instructions, when executed by the hardware processing unit, cause the hardware processing unit to:
    receive skill trigger responses from the different skills, the skill trigger responses including clickthrough resource locators; and
    send the clickthrough resource locators to the plurality of client devices.

13. The skill triggering system of claim 10, the image metadata describing different objects that are visually depicted in the input images.

14. The skill triggering system of claim 13, wherein the image metadata identifies different categories from a taxonomy or ontology for the different objects.

15. The skill triggering system of claim 14, wherein the computer-readable instructions, when executed by the hardware processing unit, cause the hardware processing unit to:
process the input images using the machine learning model to identify the different categories from the taxonomy or the ontology for the different objects.

16. The skill triggering system of claim 15, wherein the computer-readable instructions, when executed by the hardware processing unit, cause the hardware processing unit to:
execute a search engine, the search engine being configured to process the input images as search queries to identify search results; and
send the search results to the plurality of client devices.

17. A method comprising:
providing registration data for a particular skill to a skill triggering service, the registration data including a particular triggering condition specifying when the particular skill should be triggered and a resource locator of the particular skill, the particular triggering condition indicating that the particular skill is designated to be triggered based at least on objects that are visually depicted in input images;
receiving, at the resource locator, image metadata for a particular input image from the skill triggering service, the image metadata comprising image metadata values determined by a machine learning model, the particular input image visually depicting a particular object that matches the particular triggering condition and caused the skill triggering service to trigger the particular skill; and
processing the image metadata using the particular skill.

18. The method of claim 17, further comprising:
generating skill output reflecting the processing of the image metadata with the particular skill; and
sending the skill output to an application on a client device.

19. The method of claim 17, the registration data specifying a subset of available image metadata values requested by the particular skill.

20. The method of claim 17, further comprising:
providing image processing code to the skill triggering service, the image processing code being configured to analyze different images and determine whether the particular triggering condition is met.

* * * * *